(12) United States Patent
Okumura et al.

(10) Patent No.: US 8,581,859 B2
(45) Date of Patent: Nov. 12, 2013

(54) DISPLAY DEVICE

(75) Inventors: Yasushi Okumura, Tokyo (JP);
Naofumi Yoneda, Tokyo (JP); Rui Morisawa, Tokyo (JP); Mitsuhiro Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 12/617,179

(22) Filed: Nov. 12, 2009

(65) Prior Publication Data

US 2010/0164888 A1    Jul. 1, 2010

(30) Foreign Application Priority Data

Dec. 26, 2008   (JP) ................... 2008-334344

(51) Int. Cl.
*G06F 3/041*    (2006.01)
(52) U.S. Cl.
USPC .......................................................... 345/173
(58) Field of Classification Search
None
See application file for complete search history.

(56) References Cited

U.S. PATENT DOCUMENTS

| | | | |
|---|---|---|---|
| 7,456,823 B2 | 11/2008 | Poupyrev et al. | |
| 2006/0274036 A1* | 12/2006 | Hioki et al. | 345/156 |
| 2007/0247422 A1* | 10/2007 | Vertegaal et al. | 345/156 |
| 2008/0291225 A1* | 11/2008 | Arneson | 345/698 |
| 2008/0303782 A1* | 12/2008 | Grant et al. | 345/156 |
| 2009/0096801 A1* | 4/2009 | Suzuki | 345/536 |
| 2011/0227822 A1* | 9/2011 | Shai | 345/156 |

FOREIGN PATENT DOCUMENTS

| | | |
|---|---|---|
| JP | 11-134087 | 5/1999 |
| JP | 11-312040 | 11/1999 |
| JP | 2003-15795 | 1/2003 |
| JP | 2004-46792 | 2/2004 |
| JP | 2004-185331 | 7/2004 |
| JP | 2004-318123 | 11/2004 |
| JP | 2006-42170 | 2/2006 |
| JP | 2007-48237 | 2/2007 |
| JP | 4135487 | 6/2008 |
| JP | 2008-152426 | 7/2008 |

OTHER PUBLICATIONS

Office Action issued Dec. 6, 2011, in Japanese Patent Application No. 2008-334344.
Japanese Office Action issued Dec. 21, 2010, in Patent Application No. 2008-334344.

* cited by examiner

*Primary Examiner* — Joseph Haley
*Assistant Examiner* — Emily Frank
(74) *Attorney, Agent, or Firm* — Oblon, Spivak, McClelland, Maier & Neustadt, L.L.P.

(57) ABSTRACT

There is provided a device with a part or a whole of a housing thereof having flexibility. The device includes a display unit; a detection unit that detects a bent portion of the display device; and a display switching unit that switches display content of the display unit according to a position and a bent level of the bent portion of the display device detected by the detection unit.

18 Claims, 18 Drawing Sheets

FIG. 6
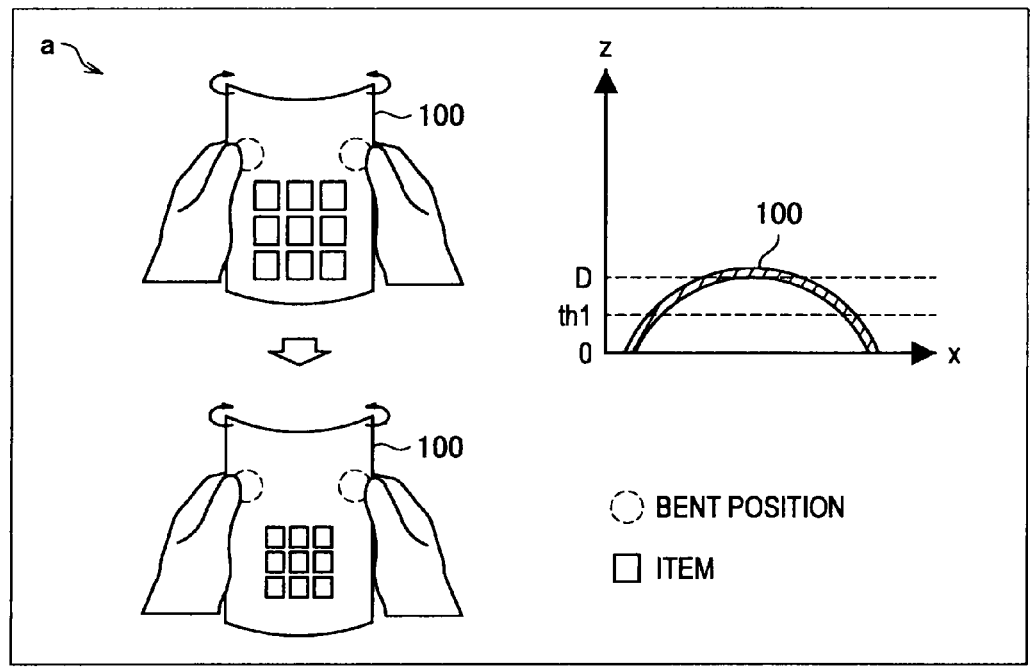
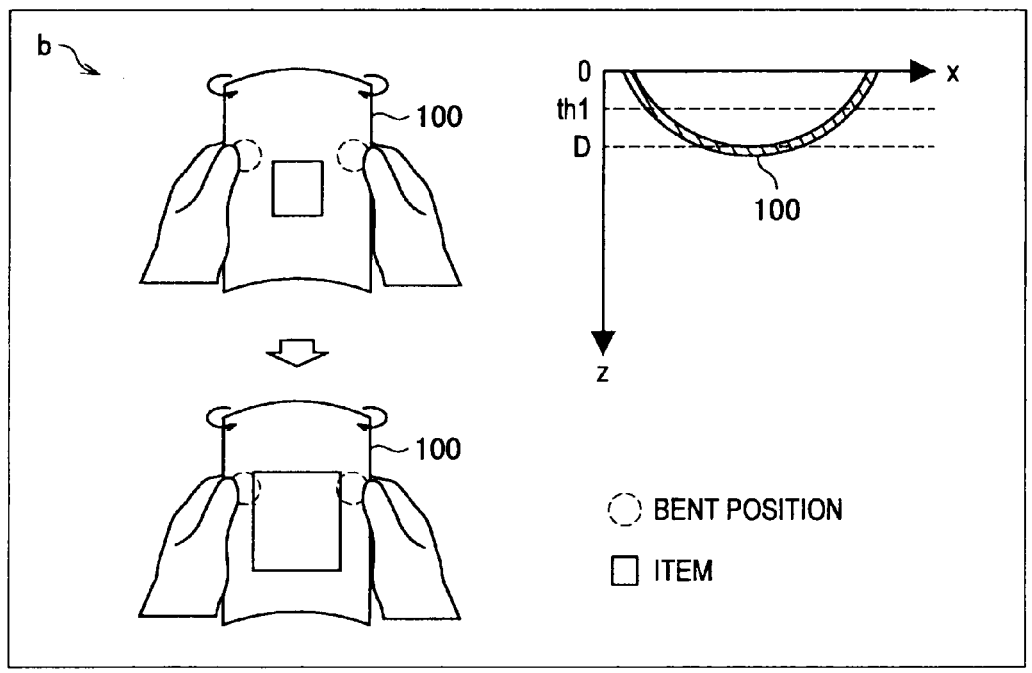

DISPLAY DEVICE

BACKGROUND OF THE INVENTION

1. Field of the Invention

The present invention relates to a display device that includes a user interface and displays information in response to an operation by a user. More specifically, the invention relates to a user interface suitable for a display device that includes neither a keyboard nor a mouse.

2. Description of the Related Art

For data input, there has been proposed a method that uses an input device such as a keyboard or a mouse or a method that uses a touch screen, a button, and a jog dial controller. In the method that uses the input device such as the keyboard or the mouse, however, operability or convenience away from home is poor. Thus, this method is not suited to use in mobile devices. Further, in the method that uses the touch screen or the like, even if the screen of a rigid device is touched, the shape of the device remains unchanged. Thus, it may be impossible to be intuitively sensed to what extent strength of the touch reflects an input operation. A challenge therefore remains for the operability of the device.

Then, there has been proposed an input interface based on a physical operation on the body of a device rather than the mouse or button (refer to Japanese Patent No. 4135487, for example, which will be hereinafter referred to as Patent Document 1). Patent Document 1 proposes the interface that allows data input without using a button, a pen, or other arbitrary input device. In this interface, in order to allow data input, a user interacts with the device by physically bending or distorting the housing of a device.

[Patent Document 1] Japanese Patent No. 4135487

SUMMARY OF THE INVENTION

Patent Document 1, however, does not conceive of switching control of display content based on a distinction between how an entire portion of the electronic device is physically changed and how an end portion of the electronic device is physically changed according to depression of the electronic device by the user when the user physically changes the electronic device in order to perform the input operation.

On the other hand, usually, the user physically operates the electronic device with one or both hands. Thus, as physical changes that may occur in the electronic device, there are a change caused by comparatively moderately bending or twisting the entire electronic device and a change caused by locally bending or distorting the end portion of the electronic device due to depression or pushing by the hand or a finger of the user.

Accordingly, when switching control of display content is performed so that an entire portion or a part of display content of a display unit is changed based on the distinction between the physical changes of the electronic device, an association that may be readily comprehended by the user is created between the physical change of the electronic device caused by the input operation of the user and the change in the display content. An intuitive input operation that has not yet been present so far may be thereby implemented for the user.

Then, the present invention provides a display device that switches display content of the display device according to the state of a bent portion of the display device.

According to an embodiment of the present invention, there is provided a device with a part or a whole of a housing thereof having flexibility, which includes a display unit; a detection unit that detects a bent portion of the display device; and a display switching unit that switches display content of the display unit according to a position and a bent level of the bent portion of the display device detected by the detection unit.

The part or the whole of the housing of the display device has flexibility. Thus, with this arrangement, the bent portion of the display device caused by an input operation of the user may be detected. Then, based on a result of the detection, the display content of the display unit may be switched.

This makes it possible to implement an input interface based on a physical operation on the body of the device rather than a mouse or a button. By switching the display content according to the position or bent level of the bent portion in particular, an association may be created between a physical change in the device caused by the input operation by the user and a change in the display content of the display unit. As a result, a display operation of the display portion is performed in conjunction with the input operation by the user, and a more intuitive input operation may be implemented.

The display device may further include a determination unit that determines whether or not an entire portion of the display device is bent, based on a result of the detection by the detection unit. The display switching unit may switch an entire portion of the display content of the display unit when the determination unit determines that the entire portion of the display device is bent.

The control of switching the entire portion of the display content of the display unit may include zoom-in control or zoom-out control of the display content.

The display switching unit may switch the display content and may perform the zoom-in control of the display content when the determination unit determines that the entire portion of the display device has been bent to be concave.

The display switching unit may switch the display content and may perform zoom-out control of the display content when the determination unit determines that the entire portion of the display device has been bent to be convex.

The determination unit may determine whether or not an end portion of the display device is bent, based on a result of the detection by the detection unit; and the display switching unit may switch a portion of the display content of the display unit when the determination unit determines that the end portion of the display device is bent.

The control of switching the portion of the display content of the display unit may include control of displaying a menu, control of making selection from the menu, display screen updating, page turning, addition of a bookmark, and addition of information on the display content, on the portion of the display content.

The control of switching the portion of the display content of the display unit may include display of at least one line visually indicating a bent state of the end portion of the display device.

The display switching unit may switch the portion of the display content to execute the control of displaying the menu on the portion of the display content when the determination unit determines that the end portion of the display device has been locally bent.

The display switching unit may switch the portion of the display content to execute the control of making selection from the menu when the determination unit determines that a user has slid his finger with the end portion of the display device locally bent.

The display switching unit may execute the control of adding the information on the display content when the determination unit determines that a corner part of the end portion of the display device has been locally bent.

The determination unit may determine whether an entire portion or an end portion of the display device is bent, according to the position and a bent amount of the bent portion.

The determination unit may determine that an entire portion of the display device is bent when the bent portion is a central portion of the display device.

The determination unit may determine that the entire portion of the display device is bent when a bent amount of the bent portion is larger than a first threshold value.

The determination unit may determine that the end portion of the display device is bent when the bent portion is an outer periphery portion of the display device.

The determination unit may determine that the end portion of the display device is bent when a bent amount of the bent portion is larger than a second threshold value.

According to another embodiment of the present invention, there is provided a display device with a part or a whole of a housing thereof having flexibility, the display device capable of being opened and closed, which includes a display unit; a detection unit that detects a bent portion of the display device; a determination unit that determines whether an entire portion of the display device is bent or an end portion of the display device is locally bent, according to a position and a bent level of the bent portion of the display device detected by the detection unit; and a display switching unit that switches a display screen mode of the display unit as display of an electronic device implemented by the display device, based on a result of the determination by the determination unit.

According to another embodiment of the present invention, there is provided a controller with a part or a whole of a housing thereof having flexibility, which includes a detection unit that detects a bent portion of the controller; and a control switching unit that switches control content of the controller, according to a position and a bent level of the bent portion of the controller detected by the detection unit.

According to the embodiments of the present invention described above, it can be achieved that display content of the display device is switched corresponding the shape of the bent portion of the display device.

BRIEF DESCRIPTION OF THE DRAWINGS

FIG. 6 is a diagram for explaining a relationship between a bent state of an entire portion of the display device and display content to be switched according to the first embodiment;

DETAILED DESCRIPTION OF EMBODIMENTS

Figure 1:
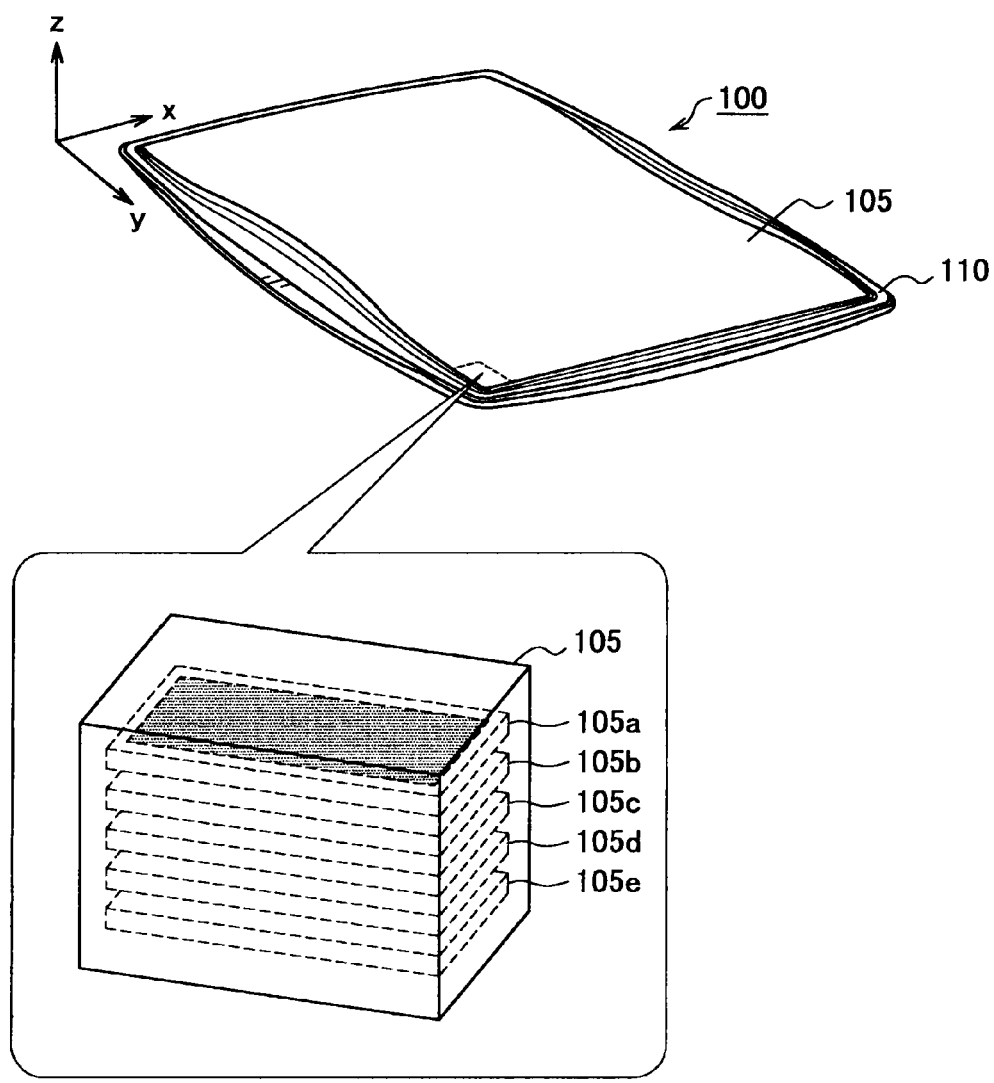
FIG. 1 is an overall configuration diagram of a display device (electronic book) according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Each embodiment of the present invention will be described in the following order:

[1] Display Device (Electronic Book) According to First Embodiment
   [1-1] Hardware Configuration of Display Device
   [1-2] Functional Configuration of Display Device
   [1-3] Bent State of Display Device and Switching of Screen
   [1-4] Display Switching Process
   [1-5] Entire Display Content Switching Process
   [1-6] Partial Display Content Switching Process
     (1-6-1) Display of Menu
     (1-6-2) Page-turning display
[2] Display Device (Portable Audio Player) According to Second Embodiment
   [2-1] Display Switching Process
[3] Display Device (Screen) According to Third Embodiment
   [3-1] Display Screen Mode Switching Process
[4] Controller (Remote Controller) According to Fourth Embodiment
   [4-1] Functional Configuration of Controller
   [4-2] Control Content Mode Switching Process
[1] Display Device (Electronic Book) According to First Embodiment
   [1-1] Hardware Configuration of Display Device First, a display device (electronic book) according to a first embodiment of the present invention will be described with reference to FIG. 1. FIG. 1 is an overall configuration diagram of an electronic book 100 and a partially enlarged view of an inner hardware configuration of the electronic book 100 according to the first embodiment. The electronic book 100 is an example of a display device in which a part or a whole of a housing has flexibility.

An entire upper surface of the electronic book 100 constitutes a display unit 105 (display), and a frame body 110 is provided at an outer periphery of the display unit 105. The display unit 105 and the frame body 110 are formed into components made of a soft material. With this arrangement, the whole housing of the electronic book 100 is made flexible. Consequently, the electronic book 100 may be wholly bent, or an end portion of the electronic book 100 may be locally distorted.

Preferably, the display unit 105 and the frame body 110 are made of a plant-based plastic formed from a polyether-block-amide copolymer. The plant-based plastic formed from the polyether-block-amide copolymer is a thermoplastic elastomer having excellent mechanical, physical, and chemical properties and a wide range of flexibility. Since this material has flexibility, shock resistance, and good formability at a low temperature, the electronic book 100 is flexibly bent according to an operation by a user.

As shown in FIG. 1 that enlarges and shows a portion of the display unit 105, the electronic book 100 according to this embodiment is formed by laminating soft materials. Specifically, the display unit 105 is an organic EL panel of a structure formed by a flexible battery 105e, a flexible circuit 105d, a bending sensor 105c, a flexible display 105b, and a flexible pressure detection touch panel (including a position sensor 105a) disposed one atop another.

The flexible pressure detection touch panel includes the position sensor 105a that detects a touch position and a touch direction of a finger of the user or a pen two-dimensionally along an X-Y direction, and is used as means for detecting an input operation in the X-Y direction. The position sensor 105a outputs a signal indicating the position or a change in the position, in response to a touch of the finger of the user or the like on the display unit 105. As the position sensor 105a, a pressure-sensitive sensor, a two-dimensional tracking sensor, a two-dimensional touch sensor, or other arbitrary sensor or sensors capable of detecting a two-dimensional change of the position may be employed. The two-dimensional position sensor may be a flexible mesh sensor or an electrostatic capacitive type sensor.

The flexible display 105b is a display in which a display portion may be flexibly deformed. In the flexible display 105b, light-emitting elements such as organic EL elements or liquid crystal elements are sandwiched between films made of plastic or the like.

The bending sensor 105c is employed as means for detecting an input operation by the user in a Z direction. The bending sensor 105c is provided below the flexible display 105b, and detects a degree of depression or a state of pushing in the Z direction by a hand or the finger of the user.

As the bending sensor 105c, an acceleration sensor, a force sensor, a pressure sensor, a distortion sensor, or a gyro sensor may be employed. Based on both of information detected from the position sensor 105a and the bending sensor 105c, an overall bent state of the electronic book 100 or a local distortion state of the electronic book 100 caused by the input operation by the user may be detected.

In the electronic book 100 of such a configuration that includes the flexible display 105b having flexibility, flexible battery 105e, and the foldable flexible circuit 105d, the touch panel (including the position sensor 105a) and the bending sensor 105c sense a distortion of the entire body and a pressure-sensitive portion of the electronic book. Though the whole housing of the electronic book 100 in this embodiment is flexible, only the frame body 110 may be formed of the soft material, and the display unit 105 may be formed of a rigid material, for example.

The position sensor 105a and the bending sensor 105c constitute an example of a detection unit that detects a bent portion of the electronic book 100. The detection unit is not limited to a specific type. When the detection unit can detect appropriate parameters, various types of detection sensors such as an electrostatic type, an electric machine type, a magnetic type, or an optical type and a combination of these sensors based on physical properties may be employed. If a three-axis sensor is used, a combination of the position sensor 105a and the bending sensor 105c does not need to be used. The bent portion of the electronic book 100 may be measured by detection of a distortion angle by a distortion sensor, detection of a pressure by a pressurization sensor, and detection of an acceleration by the acceleration sensor, for example. However, when the sensor is formed into a component of the electronic book 100 like the bending sensor 105c, flexibility is needed for the sensor.

[1-2] Functional Configuration of Display Device

Figure 2:
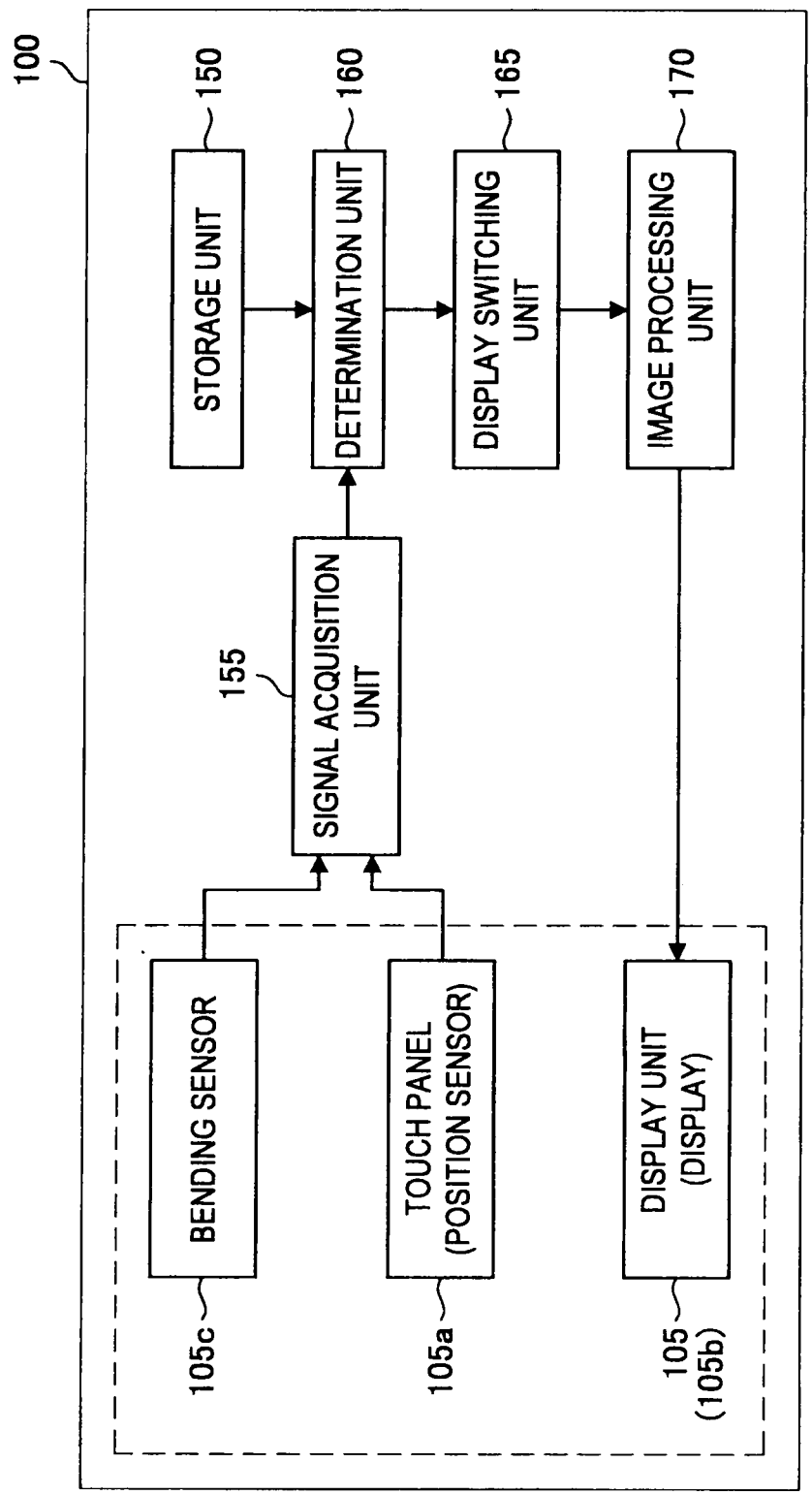
FIG. 2 is a functional configuration diagram of the display device according to the first embodiment and display devices according to second to third embodiments.

Next, a functional configuration of the electronic book 100 will be described with reference to a functional block diagram in FIG. 2. The electronic book 100 includes a storage unit 150, a signal acquisition unit 155, a determination unit 160, a display switching unit 165, and an image processing unit 170. The signal acquisition unit 155 is connected to the flexible touch panel 105a and the bending sensor 105c within the housing, which have been formed into components.

The storage unit 150 stores a first threshold value th1 for determining whether or not to perform entire display content switching control based on an overall bent level of the housing of the electronic book 100. The storage unit 150 further stores a second threshold value th2 for determining whether or not to perform partial display content switching control based on a local distortion level of an end portion (outer periphery portion of the electronic book 100 in this embodiment) of the housing.

The signal acquisition unit 155 acquires the signal indicating two-dimensional position information (in the X-Y direction) detected by the position sensor 105a. The signal acquisition unit 155 also acquires a signal indicating information on a bending (in the Z direction) detected by the bending sensor 105c.

The determination unit 160 determines whether or not an entire portion of the entire electronic book 100 is bent, based on a result of detection by each sensor. The determination unit 160 further determines whether or not the outer periphery portion (end portion) of the electronic book 100 is bent, based on the result of detection by each sensor.

More specifically, the determination unit 160 determines whether or not the electronic book 100 is wholly bent or the end portion of the electronic book 100 is locally bent, according to the position and amount of bending of the bent portion of the electronic book 100. When the bent portion is a low-curvature portion of the electronic book 100, the determination unit 160 determines that the electronic book 100 is wholly bent. When the bent portion is a high-curvature portion of the electronic book 100, the determination unit 160 determines that the end portion of the electronic book 100 is bent.

When the amount of bending of the bent portion is larger than the first threshold value th1, the determination unit 160 determines that the electronic book 100 is wholly bent. When the amount of bending of the bent portion is larger than the second threshold th2, the determination unit 160 determines that the end portion of the electronic book 100 is bent. A relationship among the curvature, the amount of bending, and a switching process of the displayed content will be described later.

The display switching unit 165 switches display content of the display unit 100, based on the result of detection by each sensor. When the determination unit 160 determines that the electronic book 100 is wholly bent, the display switching unit 165 switches entire display content of the display unit 150. As control of switching the entire display content, for example, zoom-in control or zoom-out control of the display content is included.

When the determination unit 160 determines that the end portion of the electronic book 100 is bent, the display switching unit 165 switches a part of the display content of the display unit 150. As control of switching the part of the display content, for example, control of displaying a menu, control of making selection from the menu, control such as display screen updating, page turning, addition of a bookmark, addition of information on the display content, and the like on the part of the display content are included. As the control of switching the part of the display content of the display unit 150, one or a plurality of lines may be displayed on the locally bent part so as to visually show the locally bent part of the end portion of the electronic book 100. Specific switching control will be described later.

The image processing unit 170 generates an image to be displayed on the electronic book 100. In this embodiment, the electronic book 100 displays on the display unit 150 a desired page of content downloaded through a network. The image processing unit 170 further performs an image process for displaying the one or the plurality of lines on the locally bent part of the electronic book 100.

Respective functions of the signal acquisition unit 155, determination unit 160, display switching unit 165, and image processing unit 170 are implemented by a dedicated control device or a processor (CPU) not shown which executes a program. The storage unit 150 is implemented by hardware resources including storage devices such as an HDD (Hard Disk Drive), and a ROM (Read Only Memory), not shown. The program that shows a procedure to be executed by the processor and data are stored in the hardware resources including the storage devices such as a RAM (Random Access Memory), the ROM (Read Only Memory), and the HDD (Hard Disk Drive).

The configuration of the electronic book 100 in this embodiment described herein is explained for each function. A physical configuration of hardware to be implemented does not need to be clearly separated and provided independently for each function. When the program that expresses functions of the electronic book 100 is stored in the HDD, for example, the HDD may be common with the HDD of the storage unit 150, or may be provided separately. A part of the components of the electronic book 100 in this embodiment may be disposed in other location connected through the network.

[1-3] Bent State of Display Device and Switching of Screen

Figure 3:
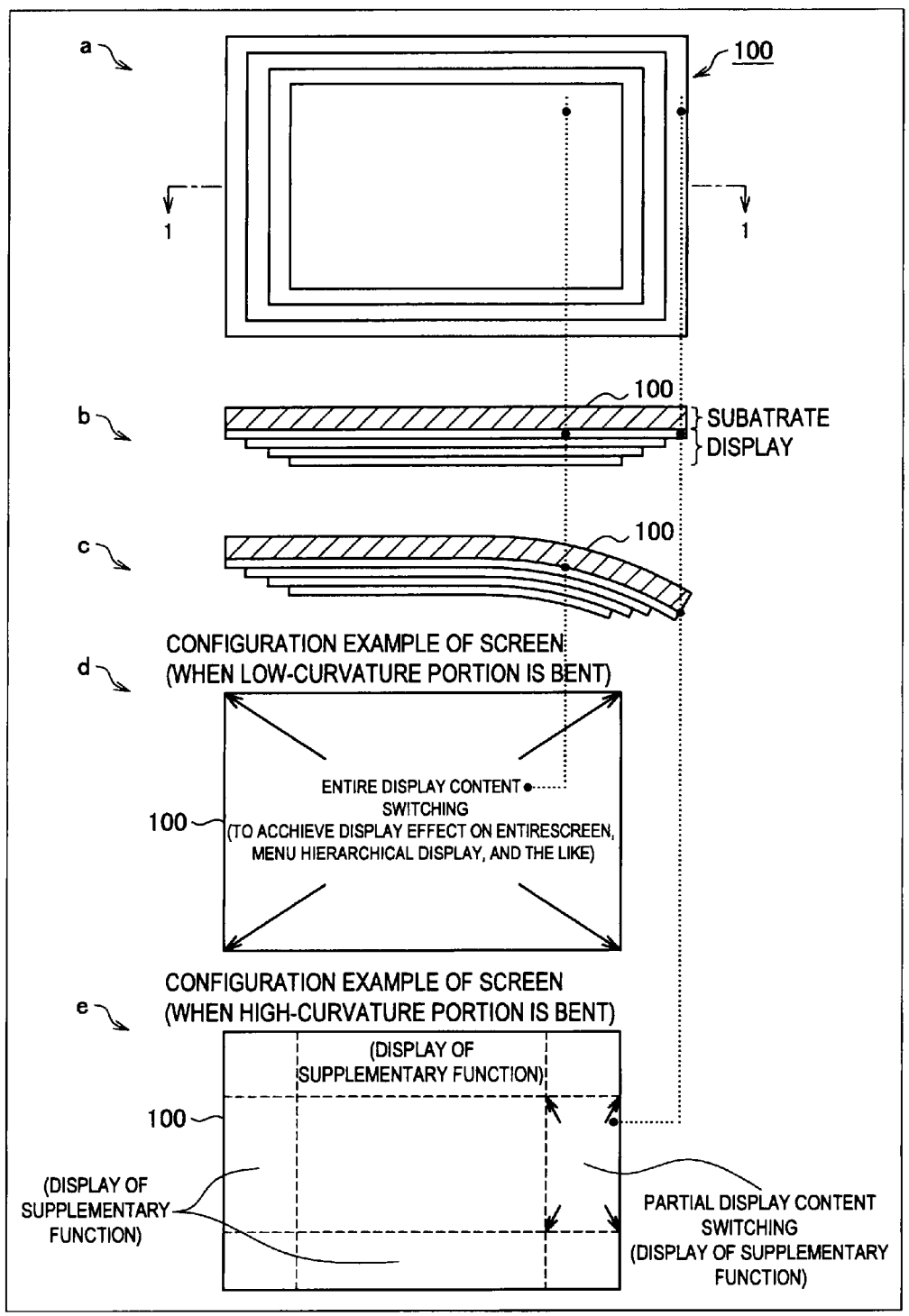
FIG. 3 is a diagram for explaining a relationship between a bent position of the display device and switching control of display content according to the first embodiment.

Next, a relationship between a bent state of the display device and switching of a screen will be described with reference to FIG. 3. FIG. 3 "a" and "b" show a display portion and a substrate portion of the electronic book 100 in which materials with different flexibility are laminated. The display portion is obtained by a laminated flexible display 105b on the substrate portion, for example. The touch panel 105a is attached to an upper end portion of the flexible display 105b. In that case, the substrate portion is constituted from the bending sensor 105c, flexible circuit 105d, and flexible battery 105e.

FIG. 3 "b" shows a section of FIG. 3 "a" taken along a line 1-1. In the electronic book 100 in this embodiment, the display portion is of a laminated structure of the flexible displays 105b so that an elevation difference is generated at outer periphery portions between the flexible displays 105b. Since the display portion is of a structure having elevation differences in this manner, an outer portion of the display portion has a smaller thickness than an inner portion of the display portion. Thus, an outer periphery portion of the electronic book 100 has higher flexibility than a central portion of the electronic book 100.

The flexibility is herein indicated by curvature. When the electronic book 100 is pushed by a same pressure, the outer periphery portion of the electronic book 100 is easier to be bent than the central portion of the electronic book 100, as shown in FIG. 3 "c". This means that the outer periphery portion of the electronic book 100 has a higher curvature than the central portion of the electronic book 100. When a curvature difference is obtained in advance, display content may be switched between when a low-curvature portion is bent and when a high-curvature portion is bent.

Whether the low-curvature portion is bent or the high-curvature portion is bent is determined by identifying the bent portion, using detection of the position of the bent portion in the X-Y direction by the position sensor 105a. When the low-curvature portion is bent, control of switching entire display content shown on the display unit 150 is executed, as shown in FIG. 3 "d". This switching control achieves a display effect on an entire portion of the screen. As an example of the control of switching the entire display content, switching of a front book cover image, or switching of hierarchical menu display to top display may be pointed out.

When the high-curvature portion is bent, control of switching a part of the display content shown on the display unit 150 is executed, as shown in FIG. 3 "e". This switching control achieves a display effect on a specific portion of the screen. As an example of the control of switching the part of the display content, display of a menu screen on a locally distorted portion may be pointed out. In this partial switching process, an image to be changed may be superimposed on an already existing image. Referring to FIG. 3 "e", four segments that display supplementary functions are provided at upper and lower portions and both end portions of an outer periphery of the electronic book 100.

Incidentally, the display portion may be formed of one flexible plate-like member instead of being of the laminated structure having the elevation difference at the outer periphery portion between the flexible displays 105b. In the plate-like display portion in that case, hardness of the material is adjusted so that the hardness is not uniform in a plane direction. Specifically, the hardness of a central part of the display portion is increased more than the hardness of an outer periphery part of the display portion. This may increase the curvature of the central part of the display portion more than the curvature of the outer periphery part of the display portion. With this arrangement, a user interface may be constructed in which sensitivity of the outer periphery portion of the display device in response to an input operation by the user is increased more than sensitivity of the central portion of the display device and is therefore sensitively reacts to user input to the outer periphery portion of the display device. As a result, a clear distinction may be made between switching of the entire display content and switching of the part of the display content, and the display device may be operated based on this distinction. By laminating the materials with different flexibility, changing the thickness of the flexible material, or changing the flexibility degree of the material in this manner, flexibility of the electronic book 100 in the Z direction is made nonuniform on an x-y surface. Switching of display may be thereby accurately controlled without causing a malfunction.

As described above, in the electronic book 100 in this embodiment, a component with the bending sensor 105c added thereto is employed separately or combined with the deformable display such as a flexible organic EL panel. The interface, in which various displays and operations are controlled, may be thereby provided to the user. In this embodiment in particular, the flexible materials are laminated and molded. Bending stresses created by both of local bending and overall bending of the display device may be thereby generated. When the bending stress is generated, parameter values associated with a change in an image and a command operation in the user interface are changed due to a bending angle and a degree of a pressure applied to the display device. With this arrangement, the display content may be thereby wholly or partially switched.

The above showed the example where the display portion is of the laminated structure with the elevation differences (as shown in FIG. 3). Alternatively, the sheet-like bending sensors may be laminated one atop the other so that an elevation difference is generated between the bending sensors. In this case, when a finger of the user moves from a central side of the display device to an outer periphery side of the display device, a bending stress is sequentially applied from the bending sensor at an uppermost layer to the bending layer at a lowest layer. This bending stress sequentially turns on the bending sensors at layers from the uppermost layer to the lowest layer. Assume that the electronic book 100 detects an input operation by the user, with this configuration. Then, it may be so arranged that when the bending sensor on an inner side of the display device is turned on from an off state, the entire display content is switched. Further, it may be so arranged that when the bending sensor on an outer side of the display device is turned on from the off state, the display content is partially switched.

[1-4] Display Switching Process

Figure 4:
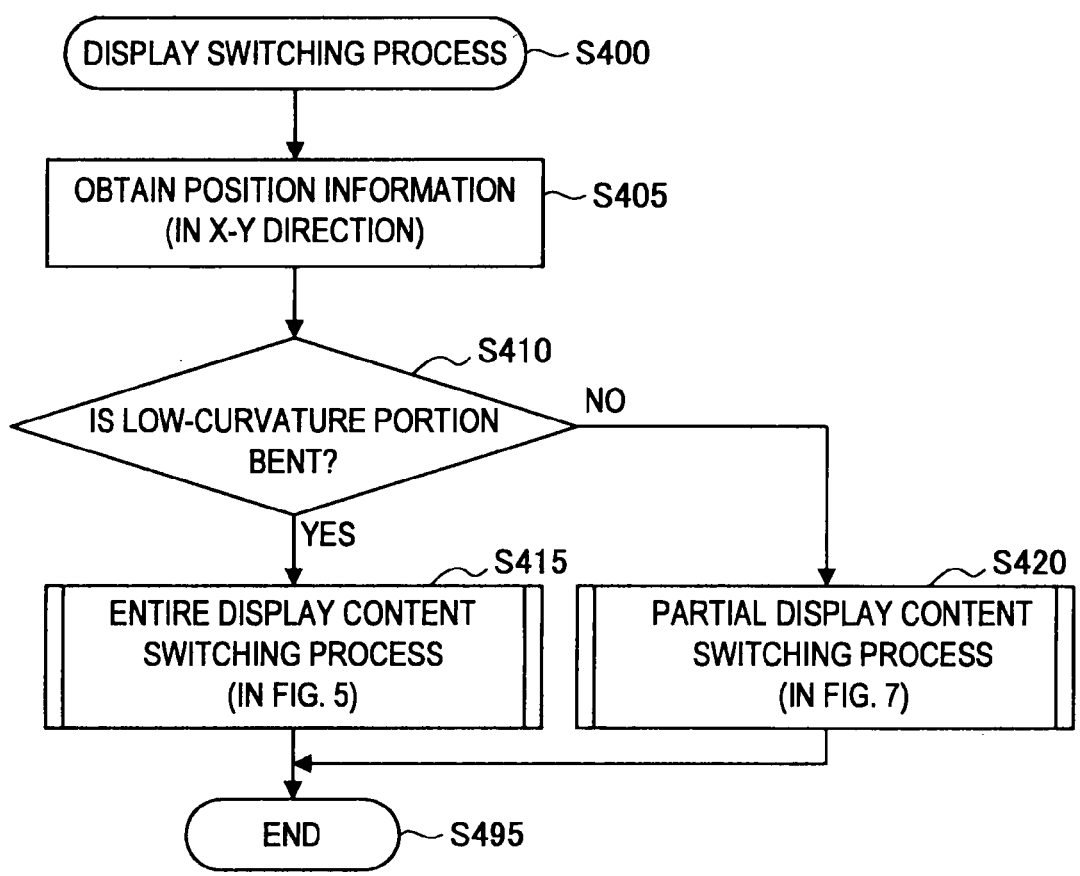
FIG. 4 is a flowchart showing an example of a display switching process according to the first embodiment.
Figure 5:
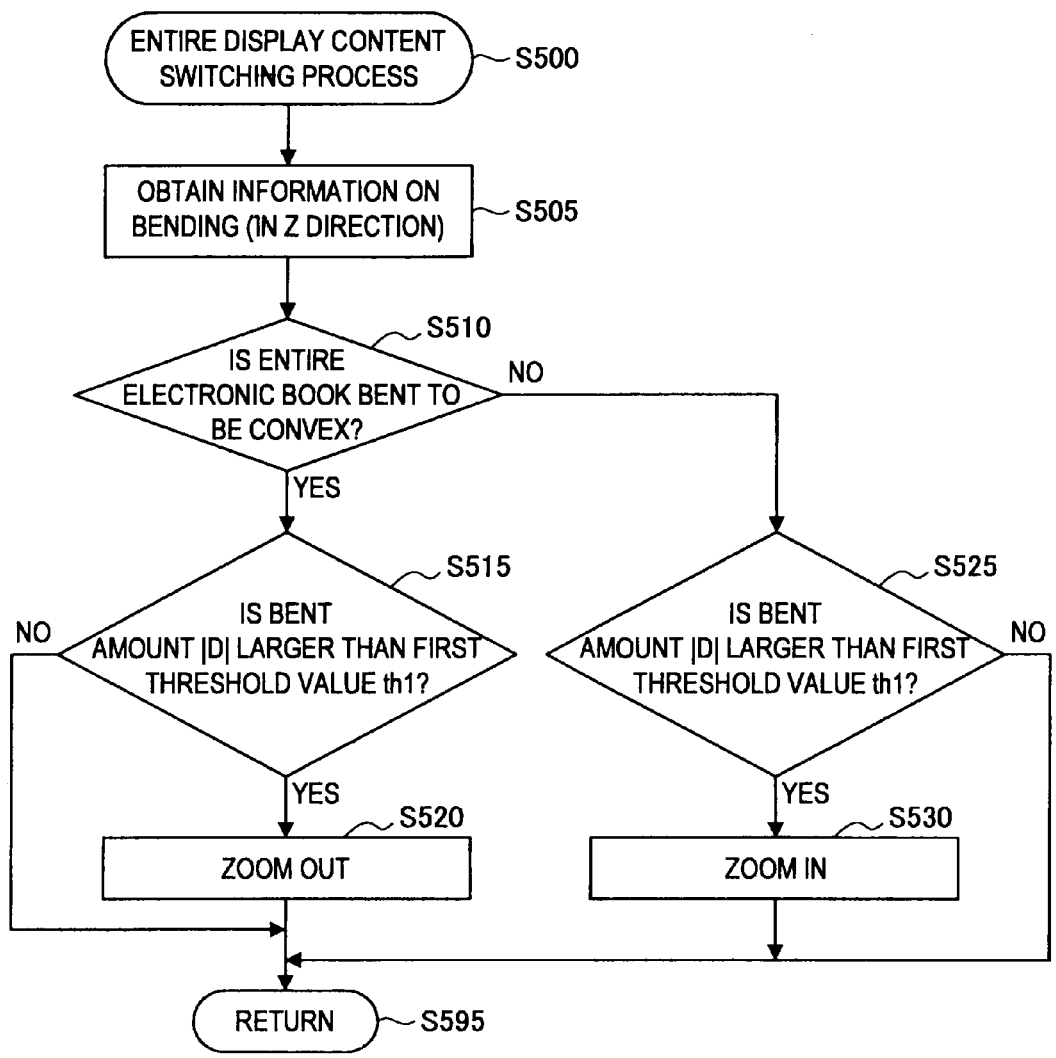
FIG. 5 is a flowchart showing an example of an entire display content switching process according to the first embodiment.
Figure 7:
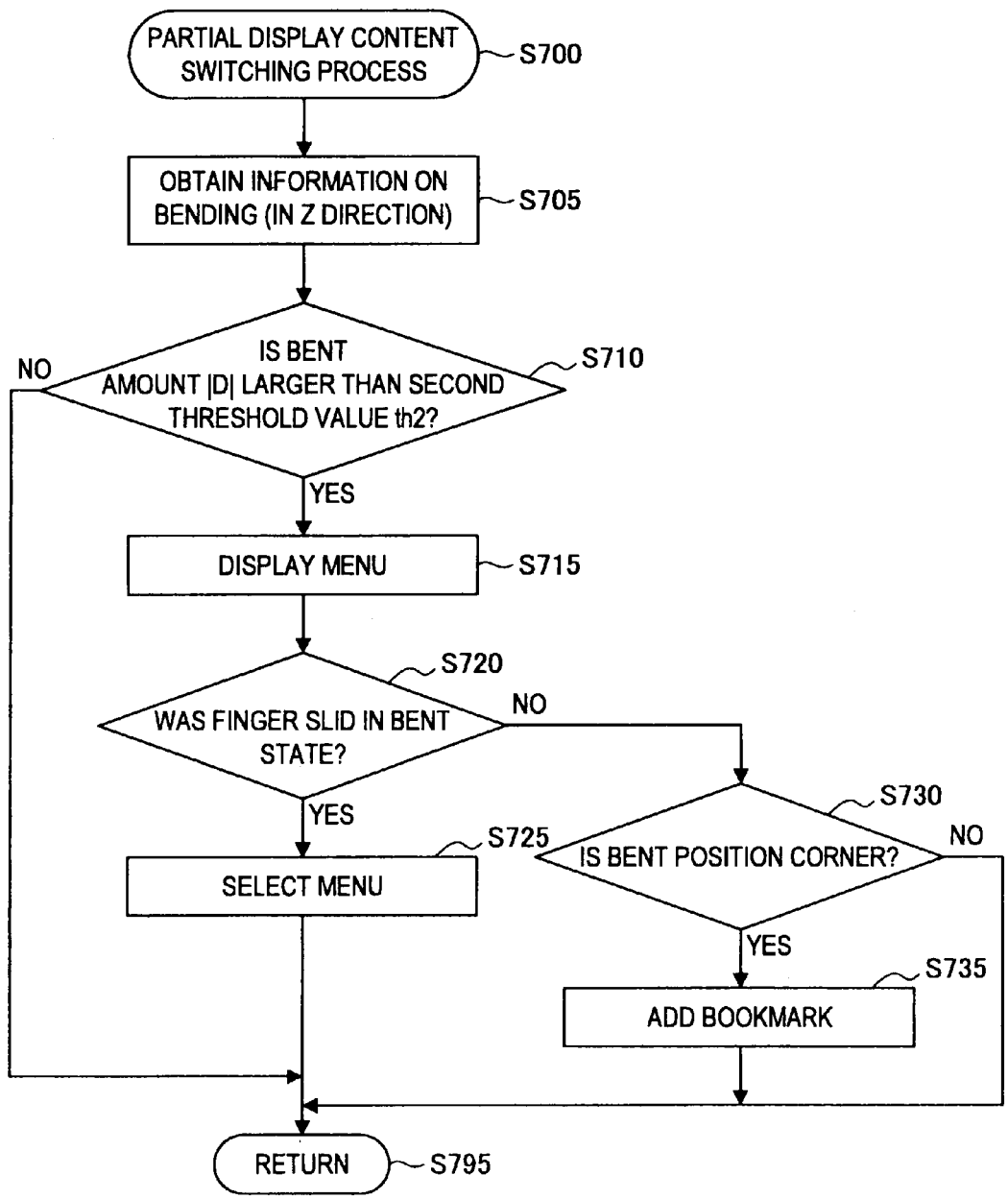
FIG. 7 is a flowchart showing an example of a partial display content switching process according to the first embodiment.

Next, a display switching operation of the electronic book 100 in this embodiment will be described with reference to flowcharts in FIGS. 4, 5, and 7. FIG. 4 is a flowchart (main routine) showing a procedure of the display switching process. FIG. 5 is a flowchart (subroutine) showing a procedure of an entire display content switching process invoked from the display switching process in FIG. 4. FIG. 7 is a flowchart (subroutine) showing a procedure of a partial display content switching process invoked from the display switching process in FIG. 4.

The display switching process is started from step S400, in response to a physical change in the electronic book caused by the user. The signal acquisition unit 155 acquires position information in the X-Y direction detected by the position sensor 105a in step S405. The determination unit 160 determines whether a low-curvature portion is bent or a high-curvature portion is bent, based on the position information acquired in step S410.

When it is determined that the low-curvature portion is bent, it is determined that the central portion of the display device is bent. Then, the entire display content switching process is invoked in step S415. On the other hand, when it is determined that the high-curvature portion is bent, it is determined that the outer periphery portion of the display device is bent. Then, the partial display content switching process is invoked in step S420.

[1-5] Entire Display Content Switching Process

The entire display content switching process invoked in step S415 is started from step S500 in FIG. 5. The signal acquisition unit 155 acquires information on a bending in the Z direction detected by the bending sensor 105c in step S505. Next, the operation proceeds to step S510. The determination unit 160 determines whether the entire electronic book 100 has been bent to be convex, or the center of the electronic book 100 has been bent inwardly relative to the user. Actually, when a bent amount D of the bending generated in the high-curvature portion of the electronic book 100 assumes a positive value, the determination unit 160 determines that in the high-curvature portion of the electronic book 100, the entire electronic book 100 has been bent to be convex. Then, the operation proceeds to step S515. In step S515, the determination unit 160 determines whether or not the absolute value of the bent amount D is larger than the first threshold value th1. When it is determined that the absolute value of the bent amount D is larger than the threshold value th1, the operation proceeds to step S520. Then, the display switching unit 165 instructs zoom-out control as switching of display of entire display content. The image processing unit 170 performs the zoom-out control of the entire display content according to the instruction. The operation then proceeds to step S595, and this process is finished.

As a result, when the user moderately bends the central portion of the electronic book 100 inwardly with both hands, an item displayed on the entire screen of the electronic book is zoomed out, as shown in FIG. 6 "a". The entire display content is thereby zoomed out.

On the other hand, when the bent amount D assumes a negative value, the determination unit 160 determines that in the high-curvature portion of the electronic book 100, the entire electronic book 100 has been bent to be concave. Then, the operation proceeds to step S525. In step S525, the determination unit 160 determines whether or not the absolute value of the bent amount D is larger than the first threshold th1. When it is determined that the absolute value of the bent amount D is larger than the first threshold th1, the operation proceeds to step S530. Then, the display switching unit 165 instructs zoom-in control as switching of display of the entire display content. The image processing unit 170 performs zoom-in control of the entire display content according to this instruction. The operation then proceeds to step S595, and this process is finished.

As a result, when the user moderately bends the central portion of the electronic book 100 outwardly with both hands, an item displayed on the entire screen of the electronic book is zoomed in, as shown in FIG. 6 "b". The entire display content is thereby zoomed in. The bent amount indicated as the information on the bending may be any one of physical amounts such as a distortion amount, a bent angle, or the like capable of detecting a bending stress.

[1-6] Partial Display Content Switching Process

Figure 8:
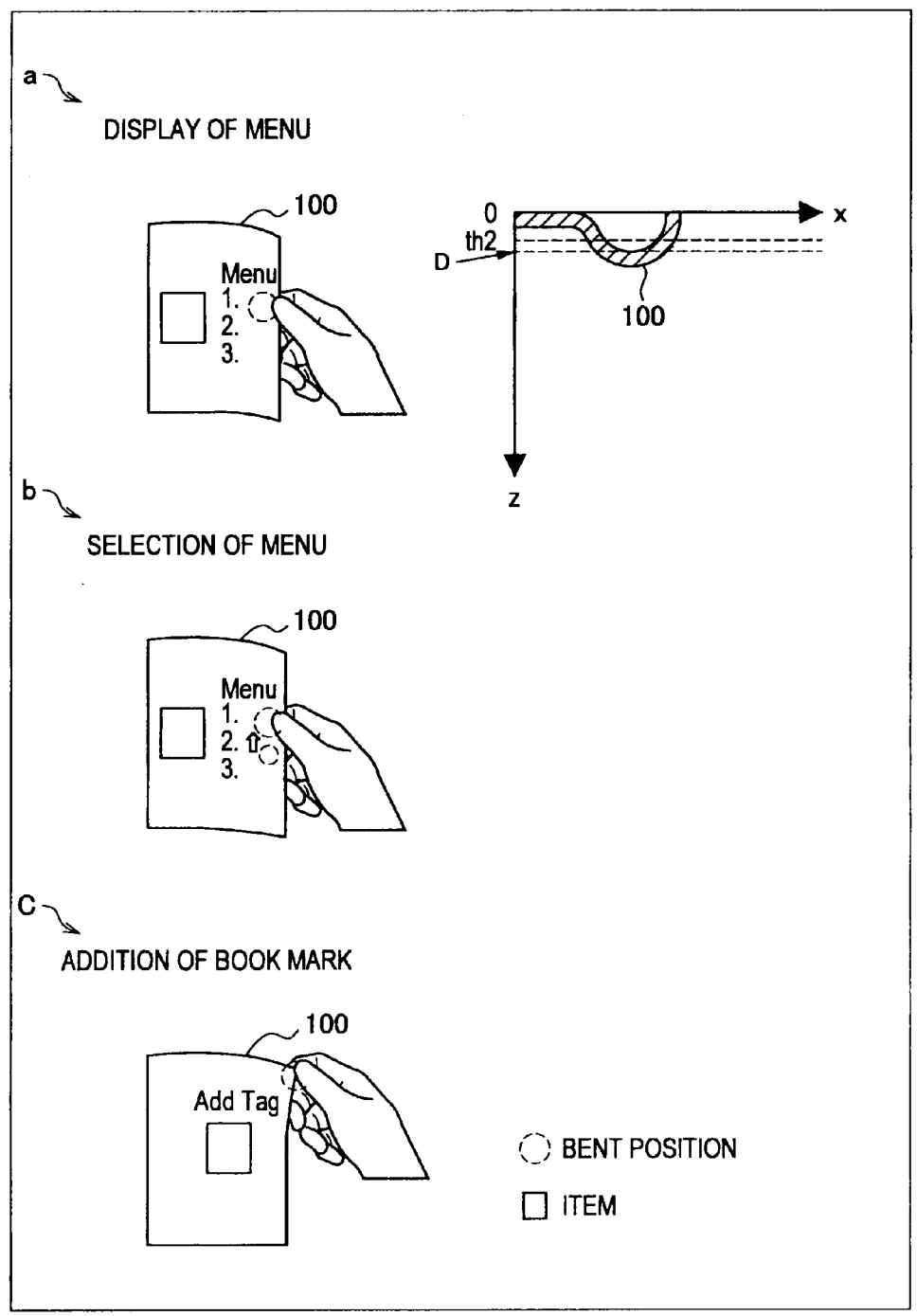
FIG. 8 is a diagram for explaining a relationship between a bent state of an end portion of the display device and display content to be switched according to the first embodiment.

Next, the partial display content switch process invoked in step S420 will be described. First, display of the menu will be pointed out as an example of the partial display content switching process and will be described with reference to FIGS. 7 and 8. FIG. 7 is a flowchart showing the partial display content switching process, as described above. FIG. 8 is a diagram for explaining the display of the menu and the like.

(1-6-1) Display of Menu

The partial display content switching process is started from step S700. The signal acquisition unit 155 acquires information on a bending in the Z direction detected by the bending sensor 105c in step S705. Next, the operation proceeds to step S710. Then, the determination unit 160 determines whether or not the bending (distortion) larger than the second threshold value th2 has been generated, based on the acquired information on the bending. When the absolute value of the bent amount D of the bending generated in a part of the electronic book 100 is larger than the second threshold th2, as shown in "D" of FIG. 8, the determination unit 160 determines that the bending stress of a predetermined value or more has been generated at the high-curvature portion of the electronic book 100. Then, the operation proceeds to step S715. The display switching unit 165 instructs menu display control as switching of display of a segmented portion of entire display content. The image processing unit 170 displays a menu shown in FIG. 8 "a" at the portion where the bending stress has been generated, according to the instruction. On the other hand, when it is determined that the absolute value of the bent amount D of the bending generated in the part of the electronic book 100 is smaller than the second threshold th2, the operation immediately proceeds to step S795, and this process is finished.

Next, the operation proceeds to step S720. The determination 160 determines whether or not the user has slid a finger on the electronic book 100 in the bent state of the electronic book 100. Actually, whether or not the user has slid the finger in the bent state of the electronic book 100 may be measured by detection of the bending stress by the bending sensor 105c and detection of movement of the position of the finger by the position sensor 105a. When it is determined as results of the detection that the user has slid the finger in the bent state of the electronic book 100, the operation proceeds to step S725. The display switching unit 165 instructs menu selection as switching of display of the segmented portion of the entire display content. The image processing unit 170 selects the menu at the portion where the bending stress has been generated, as shown in FIG. 8 "b", according to the instruction. Then, the operation proceeds to step S795, and this process is finished.

On the other hand, when it is determined in step S720 that the user has not slid the finger in the bent state of the electronic book 100, the operation proceeds to step S730. Then, the determination unit 160 determines whether or not the bent portion is located at a corner portion of the electronic book 100. Whether or not the bent portion is located at the corner portion of the electronic book 100 may be determined by detection of a position where the bending stress is generated, using the position sensor 105a. When it is determined at a result of the detection that the bent portion is located at the corner portion of the electronic book 100, the operation proceeds to step S735. Then, the display switching unit 165 instructs switching of display of the segmented portion of the entire display content. Then, the image processing unit 170 displays a bookmark, as shown in FIG. 8 "c". Then, the operation proceeds to step S795, and this process is finished.

The above description was directed to the process of displaying the bookmark by picking up the corner portion of the electronic book 100. Besides the bookmark, various information such as a date that has been read may be added to the depressed corner portion.

(1-6-2) Page-Turning Display

Figure 9:
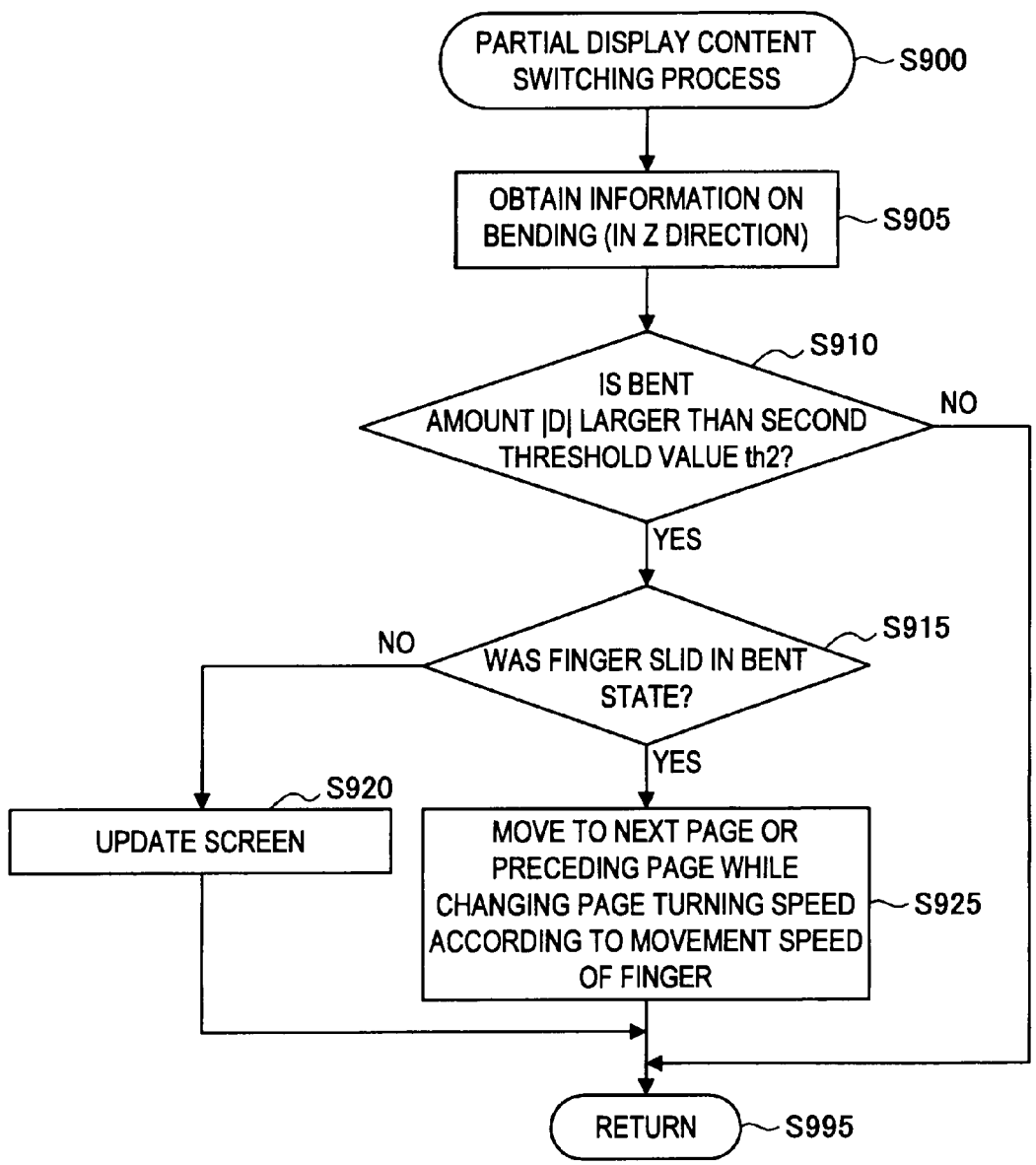
FIG. 9 is a flowchart showing another example of the entire display content switching process according to the first embodiment.
Figure 10:
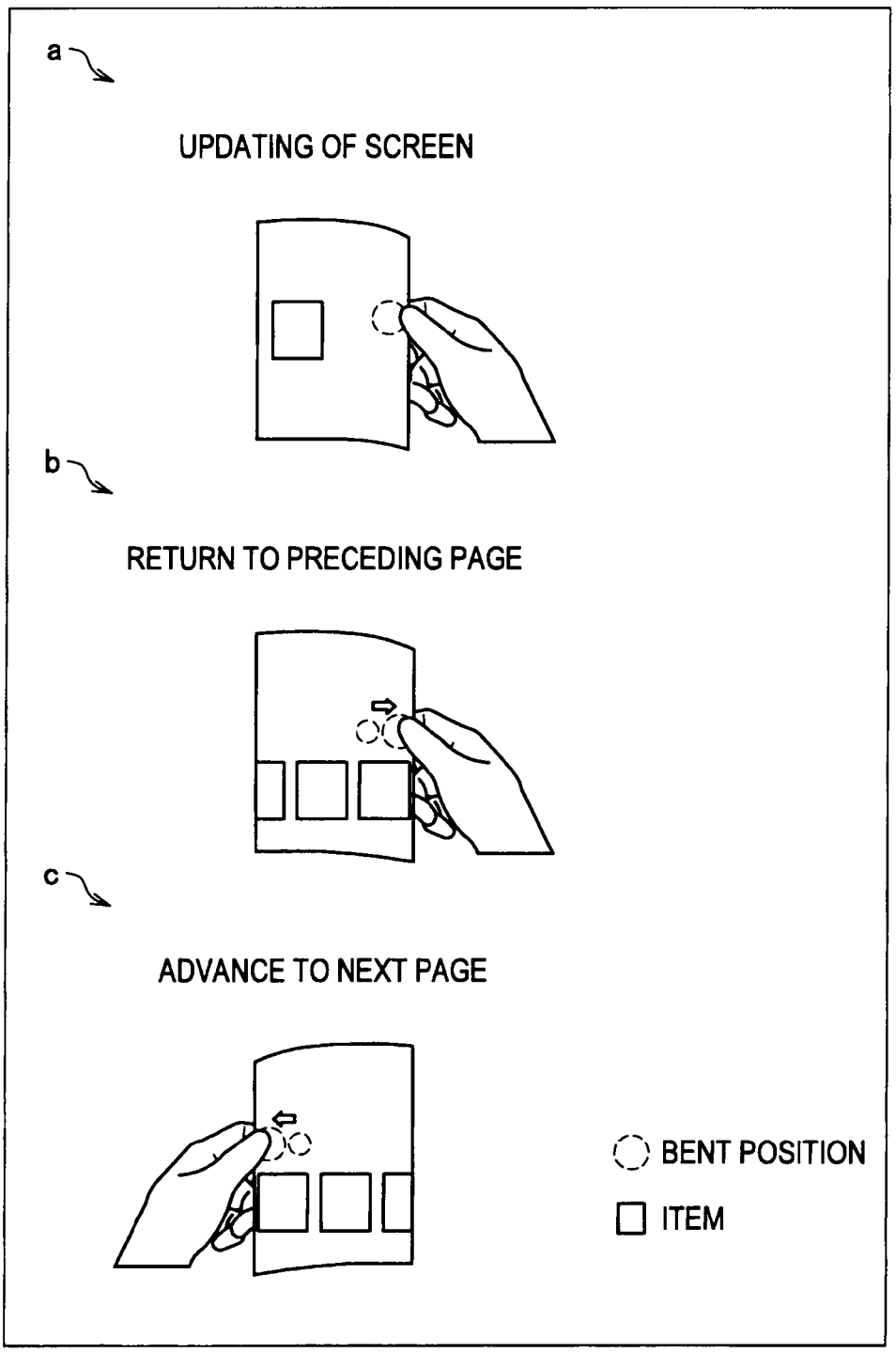
FIG. 10 is a diagram for explaining a relationship between a bent state of an end portion of the display device and display content to be switched according to the first embodiment.

Next, a page-turning display will be pointed out as another example of the partial display content switching process to be invoked in step S420 and will be described with reference to FIGS. 9 and 10. FIG. 9 is a flowchart showing the partial display content switching process that replaces the partial display content switching process in FIG. 7. FIG. 10 is a diagram for explaining the page-turning display.

The partial display content switching process is started from step S900. The signal acquisition unit 155 acquires information on a bending in the Z direction detected by the bending sensor 105c in step S905. Next, the operation proceeds to step S910. The determination unit 160 determines whether or not the bending (distortion) larger than the second threshold value th2 has been generated, based on the acquired information on the bending. When the absolute value of the bent amount D of the bending generated at an end portion of the electronic book 100 is smaller than the second threshold value th2, the operation immediately proceeds to step S995. Then, this process is finished.

On the other hand, when it is determined that the absolute value of the bent amount D of the bending generated at the end portion of the electronic book 100 is larger than the second threshold th2, the determination unit 160 determines that the bending stress of the predetermined value or more has been generated in the high-curvature portion of the electronic book 100. Then, the operation proceeds to step S915. The determination unit 160 determines whether or not the user has slid a finger on the electronic book in the bent state of the electronic book 100 in step S915. Actually, whether or not the user has slid the finger in the bent state of the electronic book 100 may be determined by detection of the bending stress by the bending sensor 105c and detection of movement of the position of the finger by the position sensor 105a. When it is determined as results of the detection that the user has not slid the finger in the bent state of the electronic book 100, the operation proceeds to step S920. The display switching unit 165 instructs switching of display of a portion of display content. The image processing unit 170 updates the screen, as shown in FIG. 10 "a", according to the instruction.

On the other hand, when it is determined that the user has slid the finger in the bent state of the electronic book 100, the operation proceeds to step S925. Then, the display switching unit 165 instructs switching of display of the portion of the display content. Then, the image processing unit 170 executes the page-turning display according to the instruction. Specifically, when the user has slid the finger while applying the bending stress on a right outer peripheral side of the electronic book 100, return to a preceding page is made, as shown in FIG. 10 "b". When the user has slid the finger while applying the bending stress on a left outer peripheral side of the electronic book 100, advance to the next page may be made, as shown in FIG. 10 "c".

The image processing unit 170 changes a page turning speed according to the movement speed of the finger. When the page turning speed is changed, the movement speed of the finger may be measured by a speed sensor or the acceleration sensor, for example.

Figure 11:
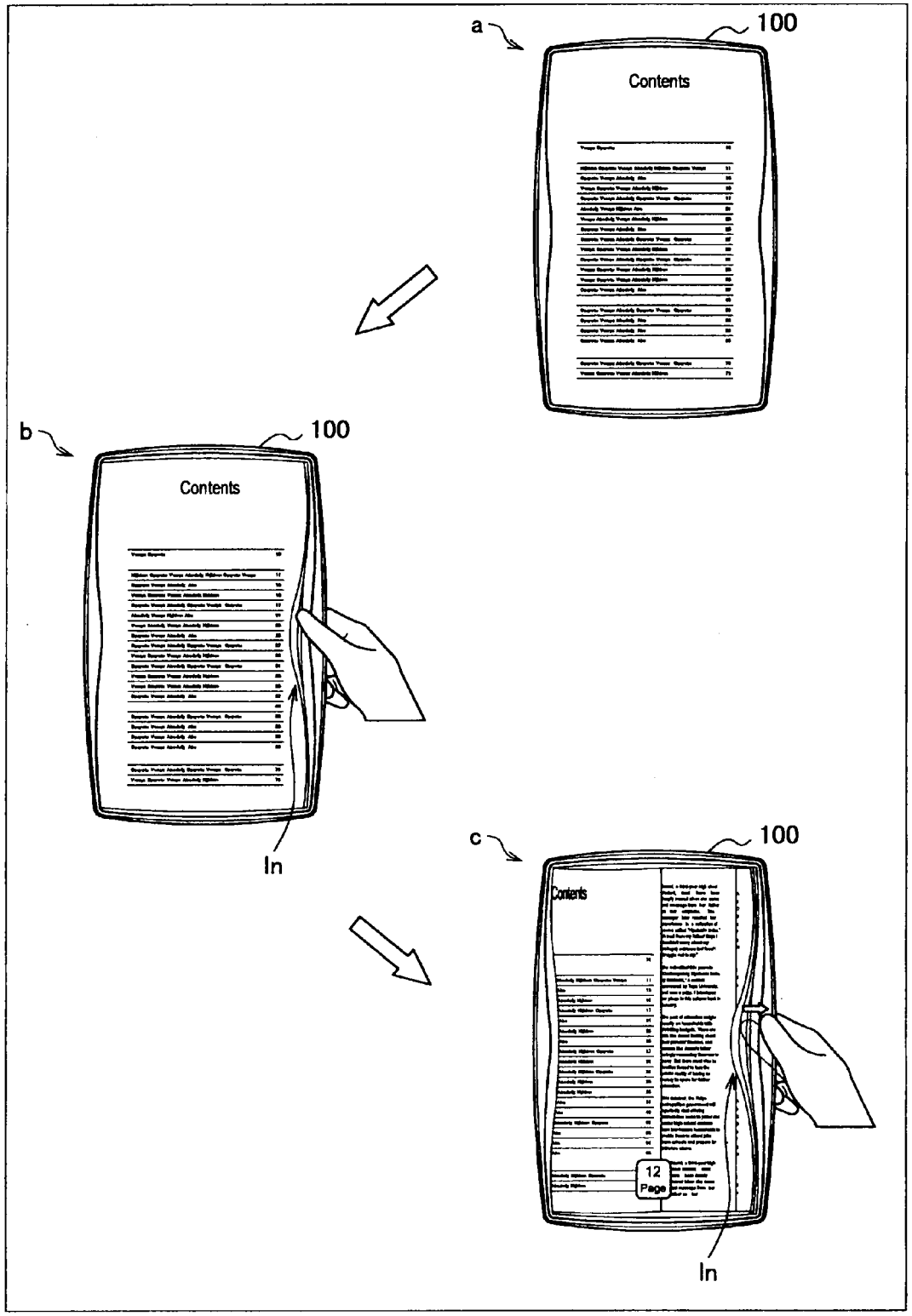
FIG. 11 is a diagram for explaining page-turning display of the display device according to the first embodiment.

The image processing unit 170 may further display at least one line In on a side of the electronic book 100 where the bending stress has been generated so that the bent state of the portion of the electronic book 100 depressed by the finger is visually shown, in response to a page turning operation. As shown in FIG. 11 "a", the line In is not displayed before the bending stress is generated. The line In is displayed in response to generation of the bending stress, as shown in FIG. 11 "b". The image processing unit 170 may greatly curve the line In for display, may increase the number of the lines In for display, or may vertically move the line In for display, when the user slides the finger outwardly in a state where the bending stress has been generated as shown in FIG. 11 "c".

In this process, display that guides an input operation is not made until the user touches the electronic book 100. However, when the user touches the electronic book 100 and bends an outside end portion of a page of the electronic book 100 from which the user desires to turn the page in the same way as a page of an ordinary book, a page turning operation is displayed. For this reason, the user may use the electronic book 100 as if he read an actual book. Further, the movement speed of the finger is reflected in the page turning speed, or the page turning operation is visually represented by display of the at least one line In. The user may thereby read the electronic book 100 by an intuitive input operation that has not been present previously.

By operating the electronic device with a similar procedure to that for a matter in an actual space, the user may readily operate the electronic device without being bothered by an input operation, and may enjoy use of the electronic device as a user-friendly device. When the user holds both end portions of the electronic book 100 and taps a desk with the bottom surface of the electronic book 100 as if he jogs documents, display content may be returned to the beginning of the content or may be returned to the content in an immediately preceding chapter. Such an operation is also the intuitive input operation in connection with a daily life operation of the user. Thus, this operation is natural and simple, being easy to be accepted by the user. Further, there is no input button on the electronic book 100. Accordingly, the electronic device which does not force the user to perform the input operation using both hands, which is beautiful in design, and of which the user is fond of, may be implemented.

[2] Display Device (Portable Audio Player) According to Second Embodiment

Figure 12:
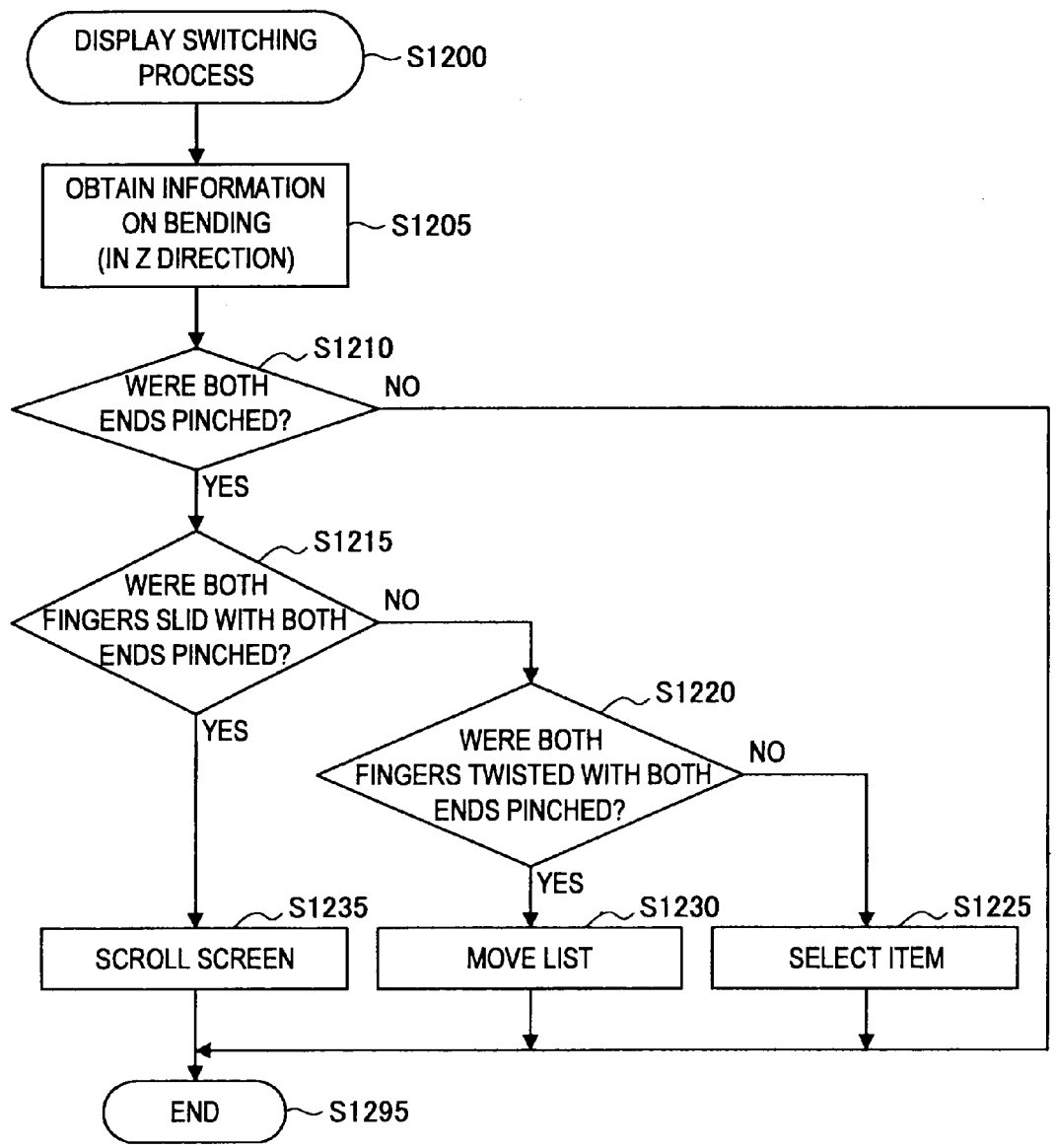
FIG. 12 is a flowchart showing an example of a display switching process according to a second embodiment.
Figure 13:
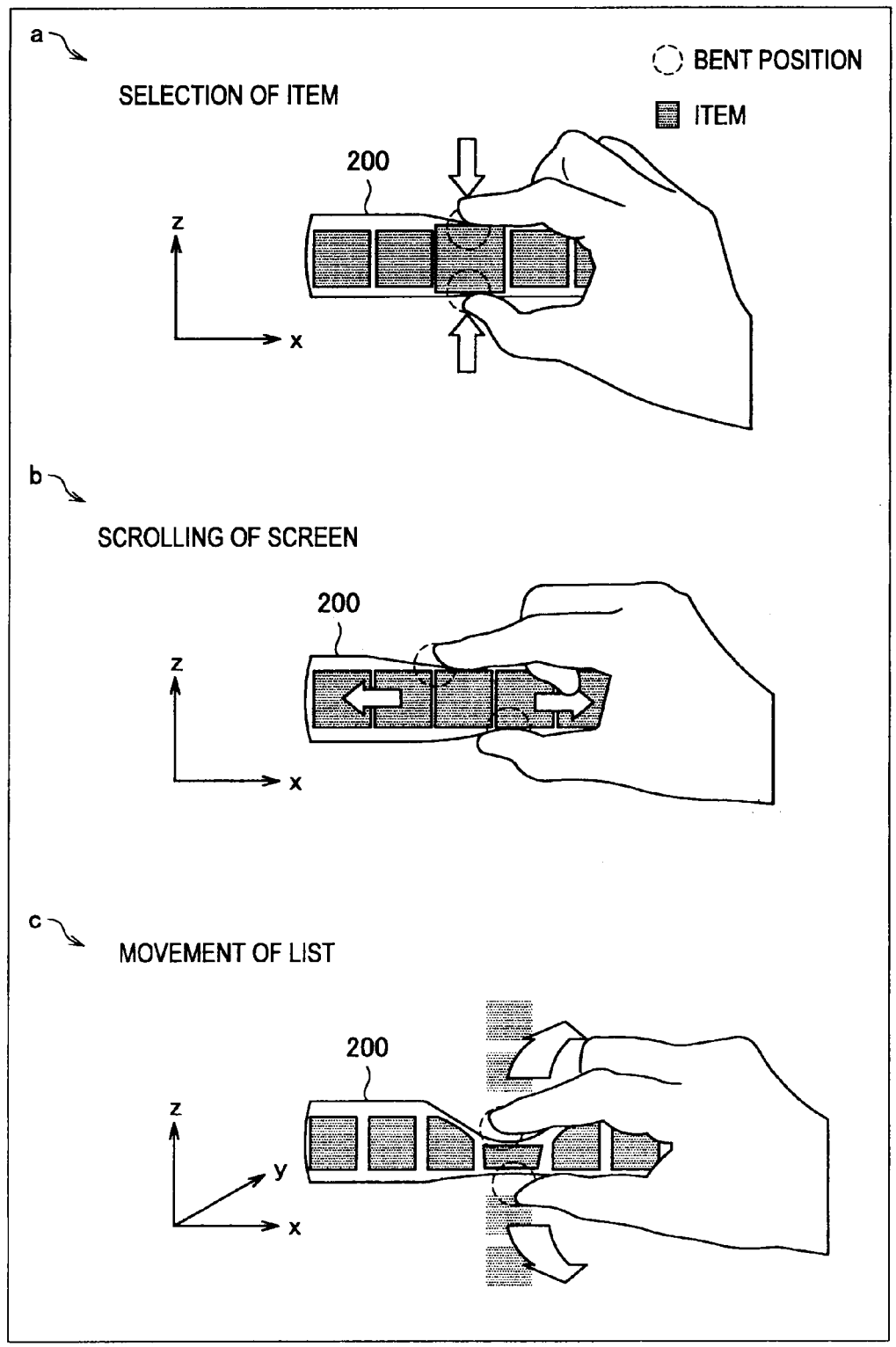
FIG. 13 is a diagram for explaining a relationship between a bent state of an entire portion of a display device and display content to be switched according to the second embodiment.
Figure 14:
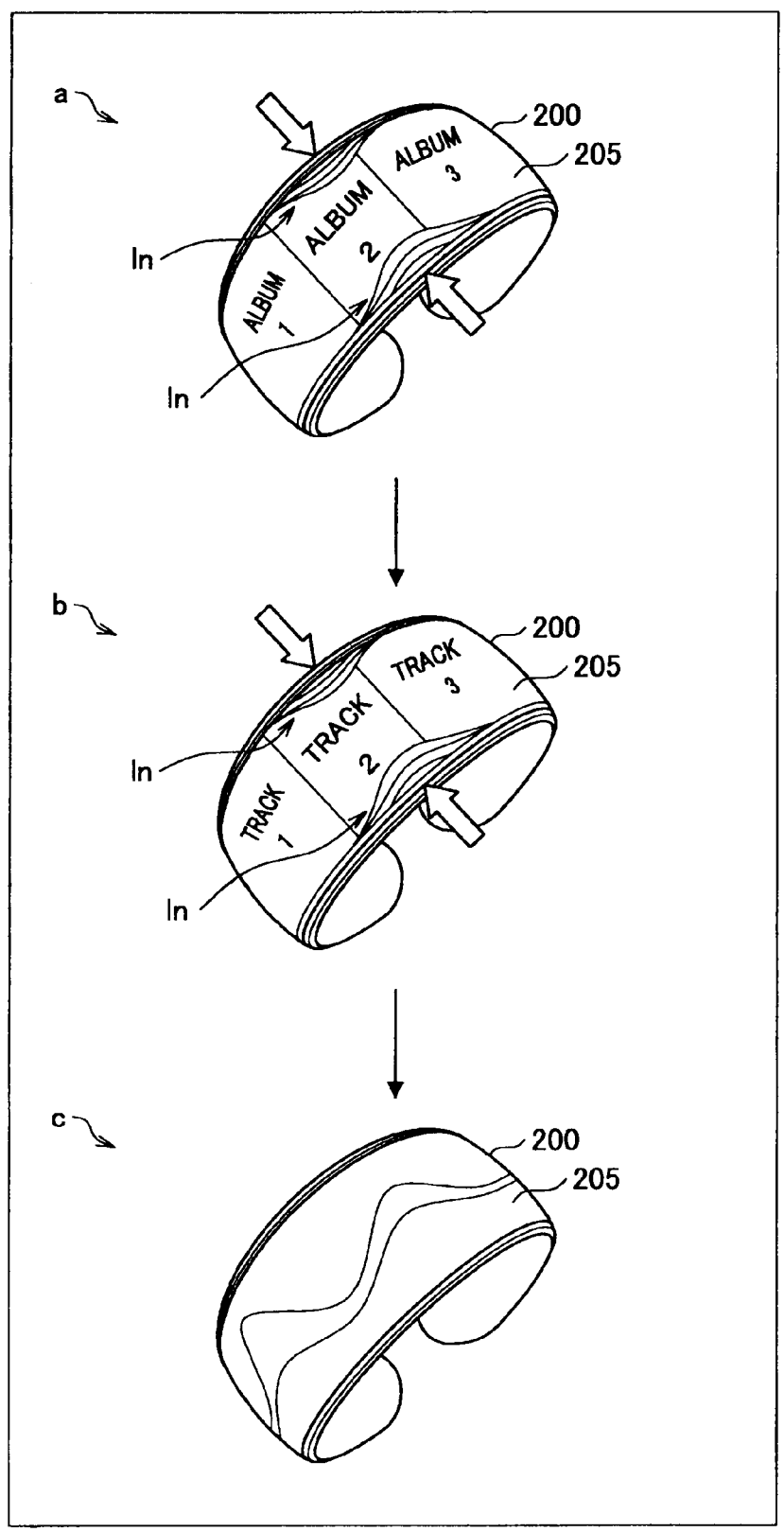
FIG. 14 is a diagram for showing an example of switching of display of a portable audio player for selection of a music piece.

Next, a display device (portable audio player) according to a second embodiment of the present invention will be described with reference to FIGS. 12 to 14. FIG. 12 is a flowchart showing a display switching process in a portable audio player 200 in the second embodiment. FIG. 13 is a diagram for explaining a relationship between an input operation and switching of display. FIG. 14 is a diagram for showing an example of switching of display of the portable audio player 200 for selection of a music piece.

As shown in FIG. 14, the portable audio player 200 is a bangle-type audio player, and functions as the audio player with a high design property and a high portability by being attached around a wrist. An entire surface of the portable audio player 200 constitutes a display unit 205, and an image may be displayed on an entire bangle. Since there is no operating button, the outward appearance of the portable audio player 200 is smooth and beautiful. Thus, the portable audio player 200 may be worn around a wrist as jewelry.

An inner hardware configuration and a functional configuration of the portable audio player 200 are the same as those in the first embodiment. The portable audio player 200 shows an example of a display device in which a part or a whole of a housing has flexibility.

[2-1] Display Switching Process

Next, a display switching process using the portable audio player 200 having such a configuration will be described. The display switching process in this embodiment is started from step S1200 in FIG. 12. The signal acquisition unit 155 obtains information on a bending in a Z direction detected by the bending sensor 105c, in step S1205. Next, the operation proceeds to step S1210. Then, the determination unit 160 determines whether or not the user has pinched both ends of the portable audio player 200, as shown in FIG. 13 "a". Specifically, when the determination unit 160 determines that the absolute value of a bent amount D of the bending generated at the both ends of the portable audio player 200 is smaller than a desired threshold value, the operation immediately proceeds to step S1295, and this process is finished.

On the other hand, when the determination unit 160 determines that the absolute value of the bent amount D of the bending generated at the both ends of the portable audio player 200 is larger than the desired threshold value, the determination unit 160 determines that a bending stress of a predetermined value or more has been generated at the both ends of the portable audio player 200. Then, the operation proceeds to step S1215. Then, the determination unit 160 determines whether or not the user has slid two fingers with the both ends of the portable audio player 200 pinched by the two fingers, as shown in FIG. 13 "b". Actually, whether or not the user has slid the fingers in the bent state of the portable audio player 200 may be measured by detection of the bending stress by the bending sensor 105c and detection of movement of positions of the fingers by the position sensor 105a. When it is determined as results of the detection that the user has not slid the fingers with the both ends of the portable audio player 200 pinched by the fingers, the operation proceeds to step S1220. Then, the determination unit 160 determines whether or not the user has twisted the fingers with the both ends of the portable audio player 200 pinched by the fingers, as shown in FIG. 13 "c".

When it is determined as a result of the determination in step S1220 that the user has not twisted the fingers with the both ends of the portable audio player 200 pinched by the fingers, the operation proceeds to step S1225. The display switching unit 165 instructs switching of display of display content. The image processing unit 170 selects an item displayed on a screen, both ends of which the user has pinched, according to the instruction, as shown in FIG. 13 "a". Then, the operation proceeds to step S1295, and the process is finished.

On the other hand, when it is determined in step S1220 that the user has twisted the fingers with the both ends of the portable audio player 200 pinched by the fingers, the operation proceeds to step S1230. The display switching unit 165 instructs switching of display of the display content. The image processing unit 170 moves the hierarchy of a list displayed on the display unit 205 to an upper hierarchy or a lower hierarchy, for display, according to the instruction. The operation then proceeds to step S1295, and the process is finished.

When it is determined in step S1215 that the user has slid the fingers with the both ends of the portable audio player 200 pinched by the fingers, the operation proceeds to step S1235. The display switching unit 165 instructs switching of display of the display content. The image processing unit 170 scrolls the screen displayed on the display unit 205 based on an amount and a direction of sliding of each finger, according to the instruction. Then, the operation proceeds to step S1295, and the process is finished.

As an example of this process, switching of display as shown in FIG. 14, for example, may be pointed out. Assume that the display unit 205 of the portable audio player 200 displays a plurality of albums 1 to 3, as shown in FIG. 14 "a". Then, when the user pinches and depresses both ends of a portion that displays an album 2, the lines In are displayed on the both ends of the display portion of the album 2, and the album 2 is selected. Then, a plurality of tracks 1 to 3 held in the album 2 are displayed on the display unit 205, as shown in FIG. 14 "b".

Next, when the user pinches and depresses both ends of a portion that displays the track 2, the lines In are displayed on the both sides of the display portion of the track 2, and the track 2 is selected. Then, reproduction of a music piece held in the track 2 is started. At the same time, a reproduction screen as shown in FIG. 14 "c" is displayed on the display unit 205.

In this process, display that guides an input operation is not performed until the user touches the portable audio player 200. However, when the user touches the portable audio player 200 and then depresses both ends of a display portion of the portable audio player 200 from which the user desires to select a music piece, the lines are displayed in association with the operation of depression and selection. Thus, the user may operate the portable audio player 200 with one hand, and with reliability. Further, the portable audio player 200 may be readily operated by an intuitive input operation for the user, which is a simple finger sliding or twisting operation. For this reason, the display device in this embodiment is suitable for operation away from home. Further, it is not necessary to install any operation button. Accordingly, the outward appearance of the portable audio player 200 is smooth with no projections and depressions, and may be worn like jewelry. In addition, by using the entire surface of the portable audio player 200 as the display unit 205, the display unit 205 may be used for the input operation, and a beautiful image associated with a music piece may be output. The portable audio player 200 of a future type, which is both functional and fashionable, may be constructed.

[3] Display Device (Screen) According to Third Embodiment

Figure 15:
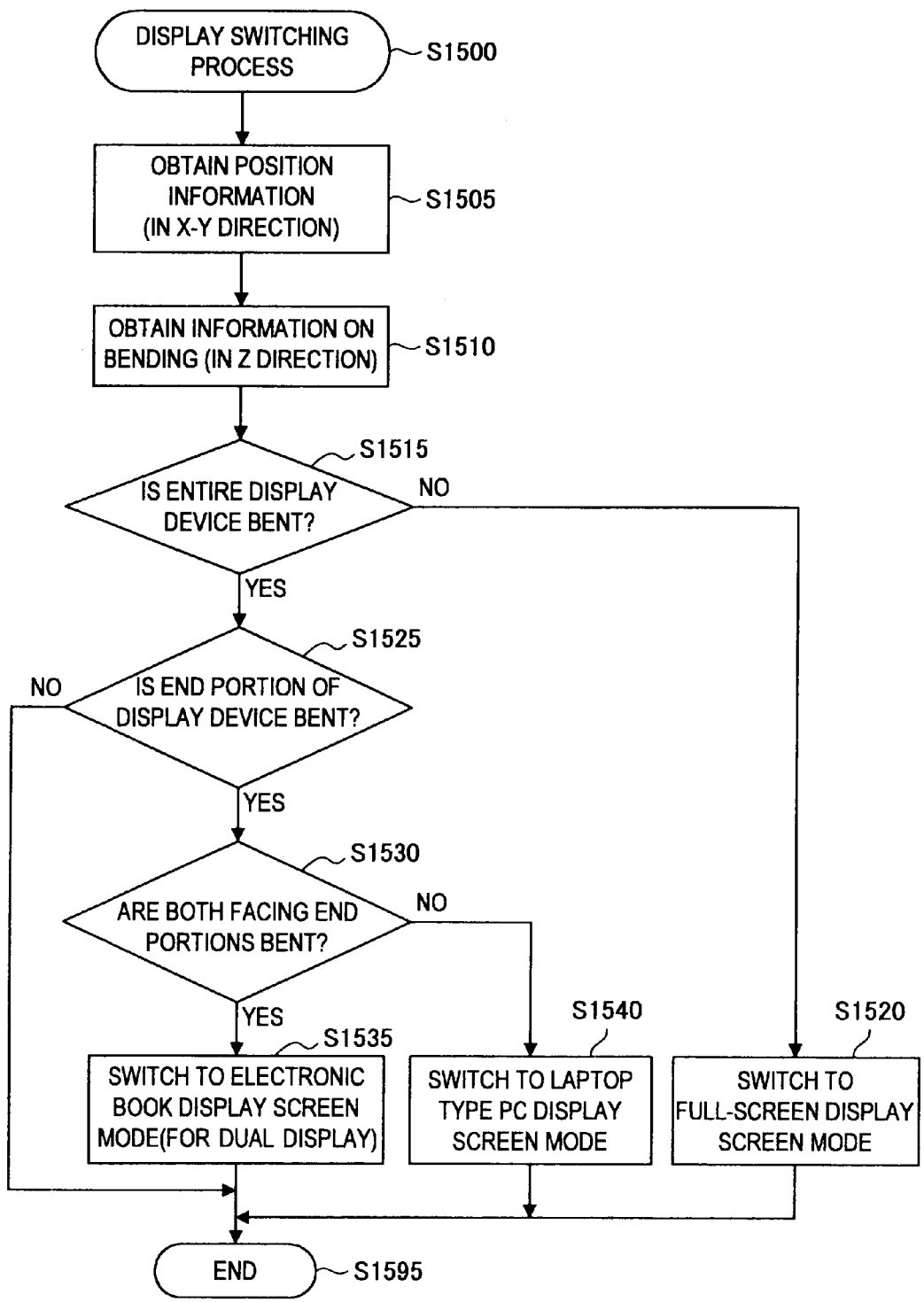
FIG. 15 is a flowchart showing an example of a display switching process according to a third embodiment.
Figure 16:
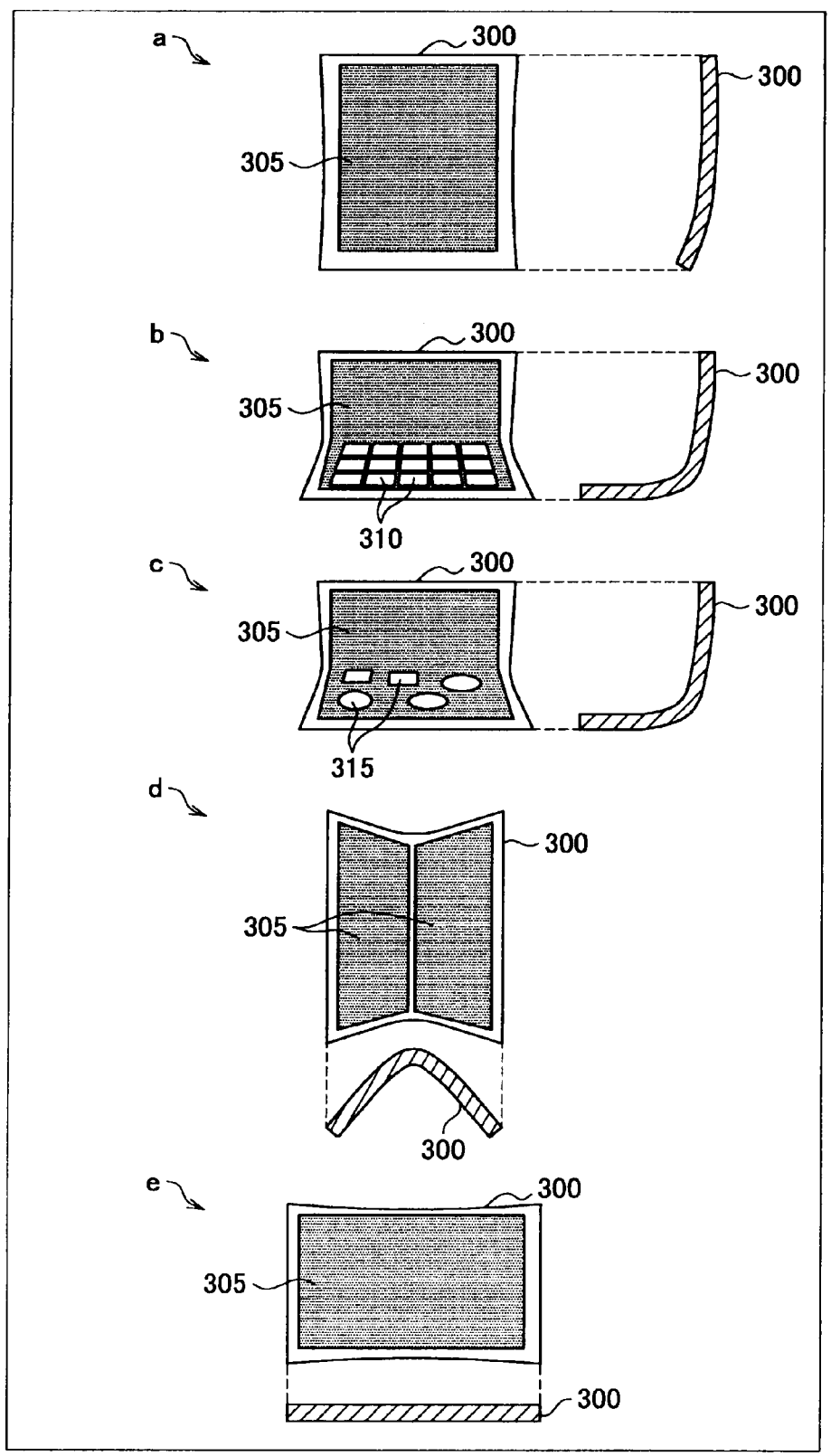
FIG. 16 is a diagram for explaining a relationship between a bent state of the display device and switching of display of a screen mode according to the third embodiment.

Next, a display device (screen) according to a third embodiment of the present invention will be described with reference FIGS. 15 and 16. FIG. 15 is a flowchart showing a display switching process of a screen 300 in the third embodiment. FIG. 16 is a diagram for explaining a relationship between a bent state of the screen 300 and switching of display of a screen mode.

The screen 300 shows an example of a display device in which a part or a whole of a housing has flexibility. An inner hardware configuration and a functional configuration of the screen 300 are the same as those in the first embodiment.

[3-1] Display Screen Mode Switching Process

Next, the display switching process using the screen 300 of such a configuration will be described. The display switching process in this embodiment is started from step S1500 in FIG. 15. The signal acquisition unit 155 obtains position information in an X-Y direction detected by the position sensor 105*a* in step S1505. The signal acquisition unit 155 obtains information on a bending in a Z direction detected by the bending sensor 105*c* in step S1510.

Next, the operation proceeds to step S1515. Then, the determination unit 160 determines whether or not an entire portion of the screen is bent, based on the position information and the information on the bending. When it is determined as a result of the determination that the entire screen is not bent to a predetermined degree or more, the operation proceeds to step S1520. Then, the display switching unit 165 instructs switching of display of display content. The image processing unit 170 switches a display screen of the screen 300 to a full-screen display screen mode according to the instruction. The operation then proceeds to step S1595, and the process is finished.

In this process, a display unit 305 of the screen 300 is switched to the full-screen display screen mode, as shown in FIG. 16 "a" or FIG. 16 "e". More specifically, the screen mode of the screen 300 is switched so that the screen 300 is functioned as a vertically mounted type full screen shown in FIG. 16 "a". Alternatively, the screen mode of the screen 300 is switched so that the screen 300 is functioned as a horizontally mounted type full screen shown in FIG. 16 "e". With this arrangement, a user may browse video content or the like on the entire surface of the display unit 305 of the screen 300.

On the other hand, when it is determined in step S1515 that the entire screen is bent to the predetermined degree or more, the operation proceeds to step S1525, and the determination unit 160 determines whether or not an end portion of the screen 300 is bent. When the screen 300 functions as an electronic book and when both hands of the user hold the electronic book at both end portions of the vertically mounted type screen 300, the screen 300 is depressed by the hands of the user. Then the both end portions of the screen 300 which are facing to each other are bent. When the screen 300 functions as a personal computer, an input operation side of the screen 300 such as a keyboard displayed on the screen 300 is depressed by an arm or a wrist of the user as the keyboard is tapped. Then, the end portion of the screen 300 is bent.

When it is determined in step S1525 that the end portion of the screen 300 is bent, the operation proceeds to step S1530. Then, the determination unit 160 determines whether or not the both facing end portions are bent. When it is determined that the both facing end portions are bent as described above, the operation proceeds to step S1535. Then, the display switching unit 165 instructs switching of display of display content. The image processing unit 170 switches the display screen of the screen 300 to an electronic book display screen mode according to that instruction. Then, the operation proceeds to step S1595, and the process is finished.

As a result, the display unit 305 of the screen 300 functions as a dual screen (dual display) shown in FIG. 16 "d". With this arrangement, the user may browse page-divided content on both of surfaces of the display unit 305 of the screen.

When it is determined in step S1530 that the both facing end portions of the screen 300 are not bent, the operation proceeds to step S1540. The display switching unit 165 instructs switching of display of the display content. The image processing unit 170 switches the display screen of the screen 300 to a laptop display screen mode according to that instruction. The operation then proceeds to step S1595, and the process is finished.

As a result, an upper half of the screen 300 functions as the display unit 305 of a laptop type personal computer shown in FIG. 16 "b" or FIG. 16 "c". A lower half of the screen 300 functions as an input operating unit such as a virtual keyboard 310, free-layout virtual buttons 315, or the like. With this arrangement, the user may display parts for editing content on a lower half surface of the display unit 305 of the screen, and may browse the content on an upper half surface of the display unit 305.

[4] Controller (Remote Controller) According to Fourth Embodiment

Figure 17:
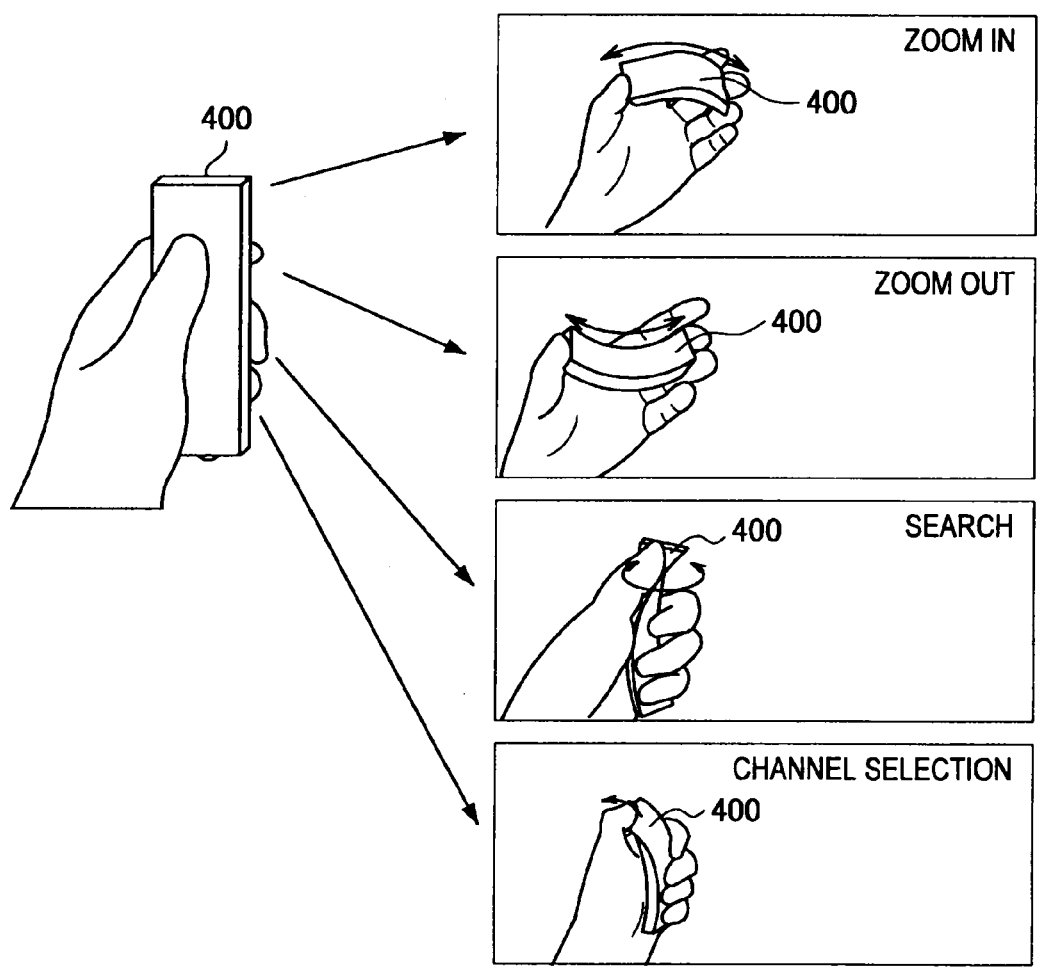
FIG. 17 is a diagram for explaining a relationship between a bent state of a controller and switching of display content according to a fourth embodiment.
Figure 18:
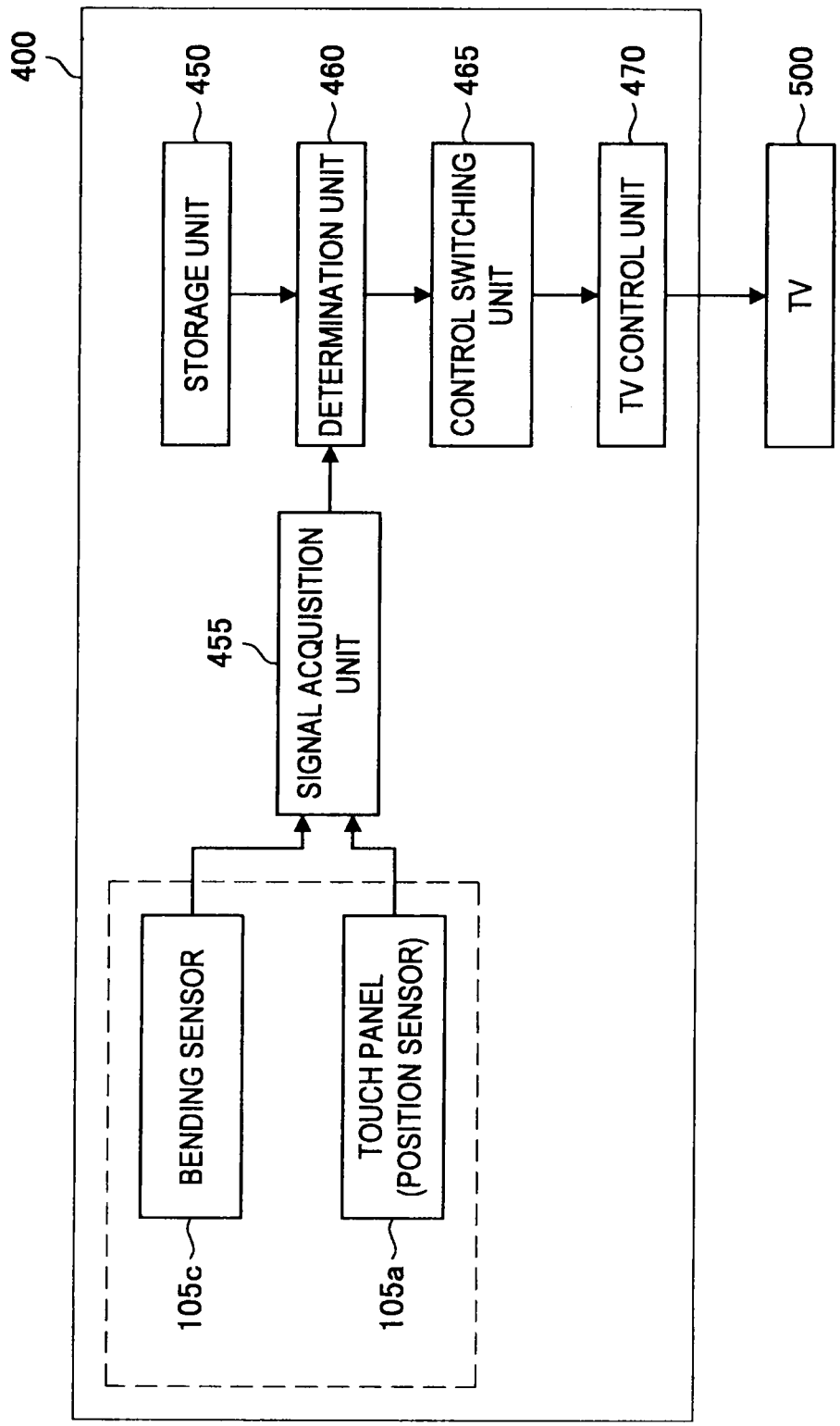
FIG. 18 is a functional configuration diagram of the controller according to the fourth embodiment.

Finally, a remote controller according to a fourth embodiment of the present invention will be described with reference to FIGS. 17 and 18. FIG. 17 includes diagrams each of which shows an example of switching control over a TV to be remotely controlled by a remote controller 400 in the fourth embodiment. FIG. 18 is a block diagram showing a functional configuration of the remote controller 400 in this embodiment.

The remote controller 400 in this embodiment is a remote controller of the TV, which is formed of a plant-based plastic. A whole of the housing of the remote controller 400 has flexibility. The remote controller 400 shows an example of a controller in which a part or a whole of a housing has flexibility. As another example where the part or whole of the housing has flexibility, a remote controller of the portable audio player 200, a remote controller of a blue ray disk, a remote controller of a DVD (Digital Versatile Disc) recorder, a controller of a gaming apparatus may be pointed out.

[4-1] Functional Configuration of Controller

The remote controller 400 includes a storage unit 450, a signal acquisition unit 455, a determination unit 460, a control switching unit 465, and a TV control unit 470. The signal acquisition unit 455 is connected to the position sensor 105*a* and the bending sensor 105*c*.

The storage unit 450 stores a threshold value for determining whether or not to perform switching control of control content according to a bent level of the housing of the remote controller 400.

The signal acquisition unit 455 acquires a signal indicating two-dimensional position information (in an X-Y direction) detected by the position sensor 105a and information on a bending (in a Z direction) detected by the bending sensor 105c.

The determination unit 460 determines how the remote controller 400 is bent, based no results of the detection by the position sensor 105a and the bending sensor 105c.

The control switching unit 465 instructs whether or not to perform switching control of control content, based on a relationship between a bent amount of a bent portion and the threshold value. The TV control unit 470 remote-controls a TV 500 according to the instruction of the control switching unit 465.

[4-2] Control Content Mode Switching Process

An example of the control content switching process performed by the TV control unit 470 will be described, with reference to FIG. 17. When a user holds both ends of the remote controller 400 and bends the center of the remote controller 400 outwardly, the housing is bent to be convex. In this case, the TV control unit 470 performs zoom-in control of the display screen of the TV 500.

When the user holds the both ends of the remote controller 400 and bends the center of the remote controller 400 inwardly, the housing is bent to be concave. In this case, the TV control unit 470 performs zoom-out control of the display screen of the TV 500.

When the user twists (rotates) an upper portion of the remote controller 400 with his thumb while grasping a whole of the remote controller 400, the upper portion of the housing is twisted in a rotating direction. In this case, the TV control unit 470 performs channel search control on the TV 500.

When the user deflects an upper portion of the remote controller 400 with his thumb while grasping the whole of the remote controller 400, an upper portion of the housing is deflected. In this case, the TV control unit 470 performs channel selection control on the TV 500.

The controller 400 in this embodiment may change content of remote control according to the state of a bent portion of the controller 400.

As described above, the display device in each of the first to third embodiments and the control device in the fourth embodiment may change display content and control content of the device according to the state of a bent portion of the device.

In the first to third embodiments described above, operations of the respective units are associated with one another and may be replaced with a sequence of operations and a sequence of processes, with the mutual association being taken into consideration. The embodiments of the display device may be thereby regarded as an embodiment of a display switching method of the display device and an embodiment of a display switching program for causing a computer to implement a function of the display device.

With this arrangement, there may be provided a display switching method of a display device with a part or a whole of a housing thereof having flexibility and including a display unit. The method includes the steps of:

detecting a bent portion of the display device by a sensor; and switching display content of the display unit according to a position and a bent level of the detected bent portion of the display device.

Further, there may be provided a display switching program of a display device with a part or a whole of a housing thereof having flexibility and including a display unit. The program is for causing a computer to execute the processes of:

detecting a bent portion of the display device by a sensor; and switching display content of the display unit according to a position and a bent level of the bent portion of the display device detected by the sensor.

In the fourth embodiment described above, operations of the respective units are associated with one another and may be replaced with a sequence of operations and a sequence of processes, with the mutual association being taken into consideration. The embodiment of the controller may be thereby regarded as an embodiment of a control switching method of the controller and an embodiment of a control switching program for causing a computer to implement a function of the controller.

With this arrangement, there may be provided a control switching method of a controller with a part or a whole of a housing thereof having flexibility. The method includes the steps of:

detecting a bent portion of the controller by a sensor; and switching control content of the controller according to a position and a bent level of the bent portion of the controller detected by the sensor.

Further, there may be provided a control switching program of a controller with a part or a whole of a housing thereof having flexibility. The program is for causing a computer to execute the processes of:

detecting a bent portion of the display device by a sensor; and switching control content of the controller according to a position and a bent level of the bent portion of the controller detected by the sensor.

It should be understood by those skilled in the art that various modifications, combinations, sub-combinations and alterations may occur depending on design requirements and other factors insofar as they are within the scope of the appended claims or the equivalents thereof.

The display device of the present invention may be used as an electronic device such as a cellular phone or a PDA (Personal Digital Assistant), in addition to the electronic book 100, portable audio player 200, and the screen 300. The display device of the present invention may be used not only as a music player, a video player, or a book reader, but also an electronic device though which the user browses a photograph viewer, a map application, a web browser, or the like. The control device is not limited to the TV remote controller 400. Remote controllers of other electronic devices or various key controllers of vehicles and the like may be used as the control device.

Relationships between input operations and switching operations are not limited to the combinations between the input operations and the switching operations described above. Referring to FIG. 13 "a", for example, when the both ends of the portable audio player 200 in a short side direction are depressed, the operation of selecting an item is executed. In addition to this operation, an operation of cancelling an immediately preceding operation may be executed when both ends of the portable audio player 200 in a longitudinal direction are depressed. Further, referring to FIG. 17, for example, when the user deflects the upper portion of the remote controller 400, switching control is performed to execute channel selection. The switching operation is not limited to this operation. When the upper portion of the portable audio player is deflected, switching control may be performed to execute fast-forwarding or playback, for example. On that occasion, a rate of the fast-forwarding or playback may be changed according to a bent amount.

The present application contains subject matter related to that disclosed in Japanese Priority Patent Application JP 2008-334344 filed in the Japan Patent Office on Dec. 26, 2008, the entire content of which is hereby incorporated by reference.

What is claimed is:

1. A display device with a part or a whole of a housing thereof having flexibility, comprising:
   a display unit;
   a touch sensor overlaid on, or formed integrally with, a surface of the display unit and configured to detect a touch input by a user;
   a detection unit that detects a bent portion of the display device;
   a determination unit that determines whether or not an end portion of the display device is bent based on a result of the detection by the detection unit; and
   a display switching unit that controls switching a portion of the display content of the display unit according to a position and a bent level of the bent portion of the display device detected by the detection unit when the determination determines that the end portion of the display device is bent, wherein
   the display switching unit:
      compares the bent level to a predetermined threshold value;
      controls the display to switch to displaying a menu when the bent level exceeds the predetermined threshold value;
      detects, based on an output of the touch sensor, whether a touch input is received at the displayed menu with the end portion of the display device locally bent;
      controls execution of making selection from the menu when the detection indicates that the touch input is received with the end portion of the display device locally bent; and
      controls addition of a bookmark when the bent level exceeds the predetermined threshold value, the menu is displayed, and the detection indicates that no touch input has been input by the user.

2. The display device according to claim 1, wherein
the determination unit determines whether or not an entire portion of the display device is bent, based on a result of the detection by the detection unit, and
the display switching unit controls switching an entire portion of the display content of the display unit when the determination unit determines that the entire portion of the display device is bent.

3. The display device according to claim 2, wherein
control of switching the entire portion of the display content of the display unit includes zoom-in control or zoom-out control of the display content.

4. The display device according to claim 3, wherein
the display switching unit controls switching the display content and performing the zoom-in control of the display content when the determination unit determines that the entire portion of the display device has been bent to be concave.

5. The display device according to claim 3, wherein
the display switching unit controls switching the display content and performing zoom-out control of the display content when the determination unit determines that the entire portion of the display device has been bent to be convex.

6. The display device according to claim 1, wherein
control of switching the portion of the display content of the display unit includes display of at least one line visually indicating a bent state of the end portion of the display device.

7. The display device according to claim 1, wherein
the display switching unit controls switching the portion of the display content to execute the control of displaying the menu on the portion of the display content when the determination unit determines that the end portion of the display device has been locally bent.

8. The display device according to claim 1, wherein
the display switching unit executes the control of adding the information on the display content when the determination unit determines that a corner part of the end portion of the display device has been locally bent.

9. The display device according to claim 1, wherein
the determination unit determines whether an entire portion or an end portion of the display device is bent, according to the position and a bent amount of the bent portion.

10. The display device according to claim 1, wherein
the determination unit determines that an entire portion of the display device is bent when the bent portion is a central portion of the display device.

11. The display device according to claim 10, wherein
the determination unit determines that the entire portion of the display device is bent when a bent amount of the bent portion is larger than a first threshold value.

12. The display device according to claim 1, wherein
the determination unit determines that the end portion of the display device is bent when the bent portion is an outer periphery portion of the display device.

13. The display device according to claim 12, wherein
the determination unit determines that the end portion of the display device is bent when a bent amount of the bent portion is larger than a second threshold value.

14. The display device according to claim 1, wherein
the display switching unit:
   compares the bent level to a predetermined threshold value;
   detects, based on an output of the touch sensor, whether a sliding touch input is received from the user when it is determined that the bent level exceeds the predetermined threshold value;
   controls the display to update when it is determined that the bent level exceeds the predetermined threshold value and that no touch input is received from the user; and
   controls the display to switch between consecutive pages of displayed content when it is determined that the bent level exceeds the predetermined threshold value and that the sliding touch input was received from the user.

15. The display device according to claim 1, wherein
the detection unit that detects whether the display device has been pinched by determining that a first bent value corresponding to a first side of the display device exceeds a predetermined threshold value and that a second bent value corresponding to a second side of the display device that opposes the first side exceeds the predetermined threshold value.

16. The display device according to claim 15, wherein
upon determining that the display device has been pinched, the display switching unit:

determines, based on an output of the touch sensor, whether a sliding touch input was received at both the first and second side of the display device; and controls the display unit to scroll content in a direction corresponding to the sliding touch input when it is determined that the display device has been pinched and the sliding touch input was received at both the first and second sides of the display device.

17. The display device according to claim 15, wherein upon determining that the display device has been pinched, the display switching unit:

determines, based on an output of the touch sensor, whether a sliding touch input was received at both the first and second side of the display device; and controls the selection of a content item displayed in an area corresponding to the first and second sides where the display device has been pinched when it is determined that the sliding touch input was not received at both the first and second side of the display device.

18. A display device with a part or a whole of a housing thereof having flexibility, the display device capable of being opened and closed, the display device comprising:

a display unit;

a touch sensor overlaid on, or formed integrally with, a surface of the display unit and configured to detect a touch input by a user;

a detection unit that detects a bent portion of the display device;

a determination unit that determines whether an entire portion of the display device is bent or an end portion of the display device is locally bent, according to a position and a bent level of the bent portion of the display device detected by the detection unit; and a display switching unit that controls switching a display screen mode of the display unit as display of an electronic device implemented by the display device, based on a result of the determination by the determination unit, wherein control of switching the display screen mode includes:

comparing the bent level to a predetermined threshold value;

controlling the display to switch to displaying a menu when the bent level exceeds the predetermined threshold value;

detecting, based on an output of the touch sensor, whether a touch input is received at the displayed menu with the end portion of the display device locally bent;

controlling execution of making selection from the menu when the detection indicates that the touch input is received with the end portion of the display device locally bent; and controlling addition of a bookmark when the bent level exceeds the predetermined threshold value, the menu is displayed, and the detection indicates that no touch input has been input by the user.

* * * * *